(12) United States Patent
McNamara et al.

(10) Patent No.: US 11,216,583 B2
(45) Date of Patent: Jan. 4, 2022

(54) SYSTEM AND METHOD FOR SECURE ANALYSIS OF DATASETS

(71) Applicant: Creme Software Limited, Dublin (IE)

(72) Inventors: Cronan McNamara, Dublin (IE);
Brian O'Mullane, Dublin (IE)

(73) Assignee: CREME SOFTWARE LIMITED, Dublin (IE)

( * ) Notice: Subject to any disclaimer, the term of this patent is extended or adjusted under 35 U.S.C. 154(b) by 0 days.

(21) Appl. No.: 15/264,734

(22) Filed: Sep. 14, 2016

(65) Prior Publication Data

US 2017/0076113 A1    Mar. 16, 2017

(30) Foreign Application Priority Data

Sep. 14, 2015 (GB) .................................... 1516260

(51) Int. Cl.
| | |
|---|---|
| *G06F 21/62* | (2013.01) |
| *G06F 21/60* | (2013.01) |
| *G06F 16/25* | (2019.01) |
| *G06F 21/31* | (2013.01) |

(52) U.S. Cl.
CPC ........ *G06F 21/6245* (2013.01); *G06F 16/258* (2019.01); *G06F 21/316* (2013.01); *G06F 21/602* (2013.01); *G06F 2221/2133* (2013.01)

(58) Field of Classification Search
CPC ............... G06F 21/6245; G06F 21/316; G06F 17/30569; G06F 21/602; G06F 2221/2133
See application file for complete search history.

(56) References Cited

U.S. PATENT DOCUMENTS

| | | | |
|---|---|---|---|
| 5,603,021 A * | 2/1997 | Spencer ................... G06F 40/18 |
| 6,297,734 B1 * | 10/2001 | Richardson .......... G06K 7/0008 340/10.2 |
| 6,917,684 B1 * | 7/2005 | Tatebayashi .......... H04L 9/0625 380/37 |
| 2002/0095405 A1 * | 7/2002 | Fujiwara ............. G06F 21/6227 |
| 2013/0282697 A1 * | 10/2013 | Barbas .............. G06F 16/24553 707/722 |
| 2014/0359730 A1 * | 12/2014 | Hang ...................... G06F 21/16 726/6 |
| 2014/0372607 A1 * | 12/2014 | Gladwin ............. H04L 43/0876 709/224 |
| 2016/0105338 A1 * | 4/2016 | Fletcher ........... G06Q 10/06393 709/224 |
| 2017/0053130 A1 * | 2/2017 | Hughes ................... G16H 10/60 |

FOREIGN PATENT DOCUMENTS

WO    WO2016063092 A1 * 10/2014

* cited by examiner

*Primary Examiner* — Aleksandr Kerzhner
*Assistant Examiner* — Aryan D Toughiry
(74) *Attorney, Agent, or Firm* — McCracken & Gillen LLC

(57) ABSTRACT

The present application provides a computer system which allows a user to make available a dataset for analysis by others whilst hiding the contents of the dataset.

24 Claims, 16 Drawing Sheets

| Index | Sample | Day (No Encryption) | Group | Tox | Factor | Region | Age |
|---|---|---|---|---|---|---|---|
| 1 | 3 | 3 | 11 | 1 | 6 | 9 | 9 |
| 2 | 1 | 2 | 3 | 13 | 6 | 11 | 5 |
| 3 | 11 | 5 | 13 | 14 | 3 | 10 | 4 |
| 4 | 3 | 1 | 10 | 7 | 7 | 1 | 9 |
| 5 | 8 | 12 | 9 | 8 | 13 | 12 | 3 |
| 6 | 4 | 12 | 8 | 5 | 1 | 6 | 14 |
| 7 | 12 | 6 | 7 | 2 | 6 | 10 | 4 |
| 8 | 14 | 8 | 11 | 7 | 13 | 1 | 14 |
| 9 | 10 | 8 | 6 | 1 | 13 | 6 | 8 |
| 10 | 13 | 11 | 13 | 4 | 13 | 11 | 13 |
| 11 | 1 | 4 | 10 | 4 | 10 | 12 | 10 |
| 12 | 6 | 6 | 13 | 11 | 4 | 7 | 3 |
| 13 | 14 | 12 | 2 | 5 | 14 | 9 | 13 |
| 14 | 8 | 1 | 6 | 6 | 3 | 2 | 8 |

| Index | Sample | Day (No Encryption) | Group | Tox | Factor | Region | Age |
|---|---|---|---|---|---|---|---|
| 1 | 27 | 3 | 1331 | 1 | 216 | 729 | 729 |
| 2 | 1 | 2 | 27 | 2197 | 216 | 1331 | 125 |
| 3 | 1331 | 5 | 2197 | 2744 | 27 | 1000 | 64 |
| 4 | 27 | 1 | 1000 | 343 | 343 | 1 | 729 |
| 5 | 512 | 12 | 729 | 512 | 2197 | 1728 | 27 |
| 6 | 64 | 12 | 512 | 125 | 1 | 125 | 2744 |
| 7 | 1728 | 8 | 343 | 8 | 216 | 1000 | 64 |
| 8 | 2744 | 8 | 1331 | 343 | 2197 | 1 | 2744 |
| 9 | 1000 | 8 | 216 | 1 | 2197 | 216 | 512 |
| 10 | 2197 | 11 | 2197 | 64 | 2197 | 1331 | 2197 |
| 11 | 1 | 4 | 1000 | 64 | 1000 | 1728 | 1000 |
| 12 | 216 | 6 | 2197 | 1331 | 64 | 343 | 27 |
| 13 | 2744 | 12 | 8 | 125 | 2744 | 729 | 2197 |
| 14 | 512 | 1 | 216 | 216 | 27 | 8 | 512 |

Fig. 4b

SYSTEM AND METHOD FOR SECURE ANALYSIS OF DATASETS

RELATED APPLICATIONS

The present application claims the priority of UK Patent Application No. 1516260.5 filed 14 Sep. 2015, the entire contents of which are herein incorporated by reference.

FIELD

The present application relates to the analysis of data sets and in particular to a system in which a user is allowed statistical access to the data of the data set but where access to the individual data values within the data set itself is limited.

BACKGROUND OF THE APPLICATION

Many companies and institutions have a large amounts of data that can provide great value to the wider world, but the data may represent a significant investment on behalf of the company or may involve proprietary information that cannot be shared and hence they may be reluctant to share it as it could then be further distributed by or re-used at will by the 3rd party.

So whilst there may be value in the data. The value only remains intact where the data remains secret. The flip side is that the value can only be monetised by sharing the data.

It will be appreciated that this results in a catch 22 situation because once the data is made available, it can be easily copied and distributed whereas hoarding the data because of the reasonable fear of loss of control diminishes the value of the data and holds back progress and innovation.

Additionally, it will be appreciated that the nature of the data might contain personal information which a data owner might not be permitted to share with third parties which might preclude them from ever sharing the data.

The present application is directed at the problem of being able to share (potentially for financial gain) the raw data without having to disclose the actual data.

Equally, it will be appreciated that the situation also applies to internal situations within a company. For example a company may wish to allow employees or third party consultants access to analyse their dataset(s) but is reluctant to make the dataset(s) fully available for fear that it may be copied and passed on to others.

SUMMARY

The present application provides a solution to this apparently impossible problem of how to share a data set with third parties without having to share the data set.

The solution operates by partially obscuring the data of the data sets. Thus for example labels for fields within a dataset are left unobscured so users can view the data set as a whole. However individual entries are obscured so even where a third party has access to a data set, their ability to view the data set in any significant detail is limited to specific aspects of the data, for example the labels. At the same time, the user is granted access to perform statistical or mathematical operations on the obscured data as if it was unobscured data and to view certain results.

A determination is made when performing a statistical or mathematical operation to determine whether the result is of a nature to significantly reveal the contents of the data. The results from the statistical or mathematical operations are only presented to the users if the result does not significantly reveal the original data. Where the result might reveal the original data, the result is either not presented or is presented in obscured form.

In the context of the present application, an obscured data value is a value that may be presented to a user as a real data value. However, the obscured data value is only a representation of a real data value that does not reveal the real data value.

The obscured value may have no direct connection to the real value or it may be a transformed version of a real data value. Once such transformation involves encrypting the real data value to provide an encrypted form of the data value. Another transformation involves applying a random variation to individual values within a data set. Another transformation involves de-correlating data values within a data set. That advantage of such a de-correlation is that certain functions can still run correctly, e.g. Min and Max, without a need for revision of the function.

Obscured values may appear as real values and accordingly may be referred to as apparent values.

Accordingly, a first embodiment provides a computer system having a data set storage area for storing at least one dataset. Each dataset has at least one table, the table having a storage structure which may be represented in tabular form with columns and rows with each column having an associated field label. Each row contains a datapoint having a plurality of elements, each element corresponding to value associated with a field label. The system has a function library storing mathematical or statistical functions which may be selected to be performed upon a stored dataset. A client interface is provided to allow a user to select at least one function to be performed upon a selected dataset.

Each data set has an exposure level associated with how much data in the data set the owner of the data set is permitting to be revealed. The system is configured to determine whether the exposure level is exceeded for the selected dataset when performing a selected function upon the selected dataset and to limit the manner in which the result is presented to the user if said exposure level has been reached. The client interface is configured to allow a user an apparent view of a dataset, the apparent view of the dataset having the same associated field labels as the dataset and the same number of datapoints but where the elements are represented in a way from which the dataset cannot immediately be reconstructed.

The apparent view of the dataset may be provided by de-correlating the elements within datapoints so that the row data presented to a user is a jumbled form of the dataset.

The apparent view may provided by encrypting the elements corresponding to at least one of the associated labels within the dataset.

The library of functions may include at least one function which may be used to obtain a child dataset from one of the stored datasets which may be considered the parent dataset. The system may allow a user to store the child dataset for the performance of a subsequent function. The exposure level of the child dataset is suitably inherited from the parent dataset.

The user uploading a dataset may provide an exposure level for the dataset. The system may be configured to track the functions called upon a dataset. The exposure level attained may be determined with respect to the aggregate of functions tracked. Each function may have an associated weighting value and these are employed when calculating the aggregate of functions tracked.

A second embodiment provides a computer system having a data set storage area for storing a plurality of datasets.

Suitably, each dataset has a structure which may be represented in tabular form with rows and columns, with each column having an associated field label and each row containing a datapoint having a plurality of elements, each element associated with a field label. A function library storing mathematical or statistical functions is provided which may be selected to be performed upon a stored dataset. At the same time, a client interface is provided allowing a user to select a function to be performed upon a selected dataset so as to provide a transformed dataset.

In this, the client interface is configured to allow a user to view the dataset in an obscured tabular form wherein the obscured tabular form corresponds to the tabular structure having the same field labels but where at least some of the elements show false values rather than the true contents.

The false values may be encrypted values and/or result from decorrelation of elements between fields of the dataset.

The library of functions may include at least one function which may be used to obtain a child dataset from one of the stored datasets which may be considered the parent dataset and where the obscured tabular form of the child is inherited from the parent.

The system may be configured to embed a watermark into a dataset prior to use by a user of the dataset. Suitably, the embedded watermark may be uniquely associated with the user.

The library of functions may include at least one function which may be used to obtain a child dataset from the watermarked dataset which may be considered the parent dataset and where the system is configured to ensure the watermark is inherited within the child dataset so that the user is associated with the child dataset.

In a third embodiment, a computer system may be provided comprising:

a data set storage area for storing at least one datasets, the dataset having a storage structure which may be represented in tabular form with columns and rows with each column having an associated field label and each row containing a datapoint having a plurality of elements, each element corresponding to a field label;

a function library storing mathematical or statistical functions which may be selected to operate upon a stored dataset;

a client interface allowing a user to select at least one function to be performed upon a selected dataset;

wherein the at least one data set has an exposure level associated with how much data in the data set is permitted to be revealed; wherein the system is configured to determine whether the exposure level is exceeded for the selected dataset when performing the selected function upon the selected dataset and to limit the manner in which the result is presented to the user if said exposure level has been reached.

One of the functions of the client interface may be to allow a user a view of the dataset and where the user is presented with an apparent view of a dataset, the apparent view of the dataset having the same associated field labels as the dataset and the same number of datapoints but where the elements are represented in a way from which the dataset cannot immediately be reconstructed.

The apparent data set may be created from the real data set by the introduction of a random variation to elements within the individual datapoints, in which case the random error may be bounded within a range of the original values of the elements. This allows a trend to still be generally visible within the data.

The apparent view of the dataset may be provided by de-correlating the datapoints so that the row data presented to a user is a jumbled form of the dataset.

The function may be one which may be used to obtain a child dataset from the at least one dataset which may be considered the parent dataset.

The system may be configured to allow a user to store the child dataset for the performance of a subsequent function, in which case the exposure level of the child dataset may be inherited from the parent dataset.

A user in uploading a dataset suitably provides an exposure level for the dataset that they desire.

The system is suitably configured to track the functions called upon a dataset and the exposure level attained is suitably determined with respect to the aggregate of functions tracked.

Each function may have an associated weighting value and these weightings are employed when calculating the aggregate of functions tracked.

The at least one function may be provided in a script written using a conventional scripting language and the computer system comprises an interpreter which employs a substitute functionality to a conventional interpreter to execute the at least one function within the script.

In a further embodiment, a computer system is provided for the storing and analysis of at least one dataset, wherein the system is configured to:

store the data set in a first form representing the dataset created by a first user; create a second form of the data set where said second form comprises the same structure, arrangement and data labels as the first form but in which individual data values have been replaced with modified data values and where the system is configured to allow the first user to share the dataset with at least one other user and to execute one or more functions upon the dataset. In this embodiment, the system is configured to select between the first form of the dataset and the second form of the dataset upon execution of the one or more functions based on a determination made from at least one:

the other user;
the function selected;
the exposure that would result;
a mode selected by the other user;
the quantum of data that is produced by the function.

In yet another embodiment, a computer implemented method is provided for granting a user, who is an employee or third party consultant, access to a dataset stored on a company controlled server, the method comprising the steps of:

a) providing a computer interface to the employee or third party identifying one or more datasets available for analysis, wherein the computer interface allows the user to provide a script comprising a plurality of functions for execution upon the dataset, the method further comprising the step of obscuring the results presented to the user so as to limit the exposure of individual data values contained within the dataset.

In a further embodiment, a computer system is provided comprising a data set storage area for storing at least one dataset, the dataset having a storage structure which may be represented in tabular form with columns and rows with each column having an associated field label and each row containing a datapoint having a plurality of elements, each element corresponding to a field label;

a function library storing mathematical or statistical functions which may be selected to operate upon a stored dataset;

a client interface allowing a user to select at least one function to be performed upon a selected dataset; wherein the datapoints are stored in a decorrelated form in which element to element correlation has been removed and wherein the correlation information is retained separately and wherein the functions are configured to employ the correlation information when executed upon a dataset.

BRIEF DESCRIPTION OF THE DRAWINGS

The present application will now be described with reference to the accompanying drawings, in which:

FIG. 4a is an exemplary dataset before an encryption process;

FIG. 4b is an exemplary dataset after an encryption process and in which the, data provider has allowed certain elements and aspects of the data to be publicly viewable;

DETAILED DESCRIPTION OF THE DRAWINGS

Example methods and systems for providing access to and analysis of data sets including the creation and use of analytical models that employ one or more such data sets. In the following description, for purposes of explanation, numerous specific details are set forth in order to provide a thorough understanding of example embodiments. It will be evident, however, to one skilled in the art that the present invention may be practiced without these specific details. In this context, it will be appreciated from the description that follows that the present application is not directed at blocking access to data files by using a password or such other security method. Instead, the present system may employ such methods generally to gain access but the present application is directed at limiting the amount of data that is exposed. In this context, the limit is not determined by providing specific user or access restrictions on individual data items or files, i.e. the limit is not a read-only or read-write privilege but instead their access is limited based on their effective interrogation of the data. In this way, the method is directed to limiting how much analysis may be performed before the data within a data set is unduly exposed.

Figure 1:
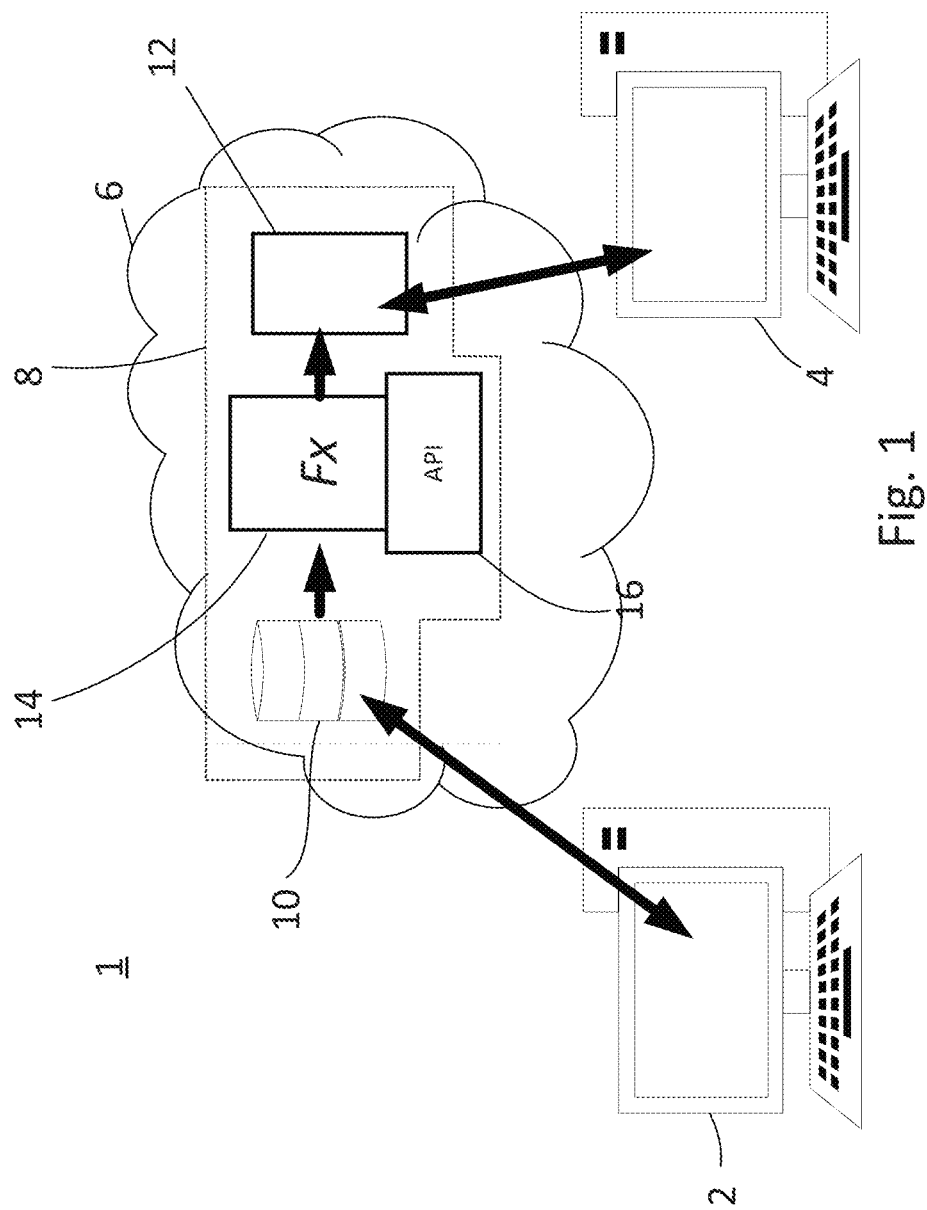
FIG. 1 represent a general system overview of an exemplary system arranged in accordance with the present application

The present application will now be described with reference to the exemplary arrangement 1 of FIG. 1 in which there is a computer server 8, provided for example on a network 6 such as the internet. The server interacts with two separate types of user which connect through client computing devices. The first type of user is that of a data set provider, connecting using a data provider computing device 2, who can provide (upload) a data set to the server. The second type of user is a data user who, using a data user computing device 4, accesses a data set previously uploaded by a data set provider.

It will be appreciated that the server, data provider computing device and data user computing device may be any suitable computing devices The data sets may be provided in any suitable file format, for example xml, xls, csv type formats. The data will be of the sort that may generally viewed as tabular in nature with data points arranged in rows with different data values of each data point arranged in columns in accordance with a set of associated labels, e.g. column headings. However, in the context of the present application, it will be appreciated that tabular refers to the ability of a dataset to be capable of being represented in such a format rather than the necessity of doing so. Thus the present application may be taken to extend to other data structures including for example relational (e.g. SQL type data) and sparse data sets.

The uploaded data sets 10 may be encrypted as will be explained in greater detail below. The server provides a client interface allowing the data user to access the data sets on the server. The access granted through the client interface may, for example, allow a user to view summary data 12 for the dataset. This summary data 12 for example suitably includes the associated labels for a dataset. It may also present a representation of the data set, thus a user might be able to see a representation of the data, i.e. they may be able to view the data as if they had direct access to the data and were for example opening the data using spreadsheet software. However, the data presented will not be actual data but an encrypted form of same, random data or data which has the appearance of being real data but is in fact distorted so that the actual data hidden in some way. In the context of the present application, an actual data set which if presented to the user represents the true contents of a data set will be referred to as a real data set and a data set which is available or presented to a user in which the contents of a real data set is obscured or hidden will be referred to as an apparent data set.

Thus a user might be presented with an apparent data set which presents a view corresponding to a real data set with the associated labels viewable and apparent datapoints. Thus a viewer can see the scale and nature of the datapoints but the actual values presented as datapoints therein are not the actual values but are instead apparent values. Alternatively stated, the values are such that the view of the data elements appear to be real but in reality actually hide the data set. Alternatively stated, starting from the apparent datapoints, the actual values cannot readily be determined. This may superficially appear pointless, however data analysts like to be able to view data to sense the scale of it rather than necessarily having to consider each individual value within a dataset.

At the same time for example the data may be presented in such a way that certain values are presented as real, e.g. the maximum and minimum values but that the true values of the other data values are hidden. Similarly, the entire contents of data set need not be obscured, instead values associated with one or more individual labels of the dataset (e.g. those in columns having the individual labels) may be presented as apparent data values with other values left unchanged. Accordingly, when reference is made to an apparent data set, it defines a data set having values representative of an actual data set but in which reproduction of the real data set is impossible from the date values within the data set.

In this context, another way in which apparent data may be presented is that the entire data set may be viewable but correlation information may be removed. For example, in table 1 below, there are five data points, each identifying an individual child. The individual values within individual datapoints are correlated with respect to one and other, thus in the exemplary data from table 1, it is clear that the 2 year old is a 1 m tall girl.

TABLE 1

Correlated Data

| Age | Height | Sex |
|-----|--------|-----|
| 3 | 1.1 m | M |
| 2 | 1.0 m | F |
| 3 | 1.2 m | M |
| 4 | 1.5 m | M |
| 5 | 1.6 m | F |

However, the same data set may be de-correlated and presented in an uncorrelated fashion such that individual values within an apparent datapoint are not correlated. The individual values within the data set are correctly presented. The label individual values are shown as being associated with is correct but there is no correlation between values within the individual datapoints, i.e. the elements in the columns are not correlated so that the original datapoints are not determinable in their original form.

TABLE 2

Uncorrelated representation of data of Table 1

| Age | Height | Sex |
|-----|--------|-----|
| 3 | 1.0 | F |
| 2 | 1.1 | M |
| 3 | 1.6 | M |
| 4 | 1.2 | M |
| 5 | 1.5 | F |

In another variation, an apparent data set may be presented to a user in which the encrypted representations of the data values are represented rather than the actual values.

It will be appreciated that in all of the variations discussed, the apparent data set provides a view of the actual data set and shows the same data labels and it is the data values that are apparent, so the data appears at least superficially to a user to be real. Indeed, the data may allow for some basic operations without providing a completely misleading result.

A further approach to providing apparent data is where the apparent data values correspond to the real data values to which a random variation has been applied to individual values within the data set. In this manner, each data value in each row may have a random variation applied to them For example, an apparent value may be generate using the formula:

apparent value=real value*(1+$V$*($RND$−0.5))

Where RND is a random number between 0 and 1 and V is the range of the variation, i.e. a limit of + or −10% on the range of individual apparent values compared to their associated real values would represent a range of 0.2 (i.e 20%). Other calculations are possible, for example a random variation may be added/subtracted rather than multiplied in or a combination of both could be employed. Where both are employed different random numbers may be used for each part of the calculation.

The client interface also allows a user access to a library of mathematical or statistical functions 14. This access for example may be provided by means of an application programming interface (API) 16. The library of functions allow a user to perform one or more predefined functions upon an individual data set (or group of data sets). Suitably, each function is performed by reference to associated labels in the data. Thus in a simple data set for children in a class, there could be a datapoint for each child in the class and associated labels, e.g. age, name and height. In this simple example, a user might apply an average function referencing the associated label of age which would return the average age of the children in the class.

Allowing a user access to perform statistical analysis on a data set without the ability to view\retrieve the individual values for individual data points means that the data provider can allow use of their data without the risk of disclosing the data.

It will be appreciated that it is possible to use statistical analysis to reconstruct a data set even if individual values are not visible. For example, consider a data set comprising a series of 100 datapoints, where each of the datapoints simply contain a single value with an associated label of age.

The dataset can be reconstructed simply by using a minimum function (e.g. Min(age)) to determine the age of the youngest age, a maximum function (e.g. Max(age) to determine the age of the eldest, whereafter the dataset can be reconstructed simply by using a count function, to count the number of values for each year between the age of the youngest and eldest, from which the entire data set may be reconstructed.

To prevent this happening, the server is configured to perform a requested function (or functions) on a data set but to limit the access to the result based on the nature of the result. This may for example include reference to the nature of the applied function or previously applied functions.

In this context, the present application provides a method that limits the exposure of a given data set whilst allowing a user to perform an analysis on the data set to obtain a required result.

In this context, an exposure level may be established and used to impose a limit on the amount of analysis that may be performed. This exposure level may be regarded as representing to what extent the overall contents of the data set or a set of values within the data set (e.g. one column of data values) set might be exposed after an analysis or group of same has been performed. An exposure level of 30 percent would mean that if there were 100 data values, that 30% of them could be taken to have been revealed. It will be appreciated that the exposure level may not necessarily equate to such a precise definition but may for example be reflective of something different. For example, in the case of a situation where a random variation had been applied to the data values such that they varied ±15%, then a exposure level may be referenced with a situation where a user acquires sufficient information to reduce the effective variation to less than that, i.e. 100% equates to where all the values are known whereas 33%% exposure would represent where the variation was reduced to ±10%.

Figure 2:
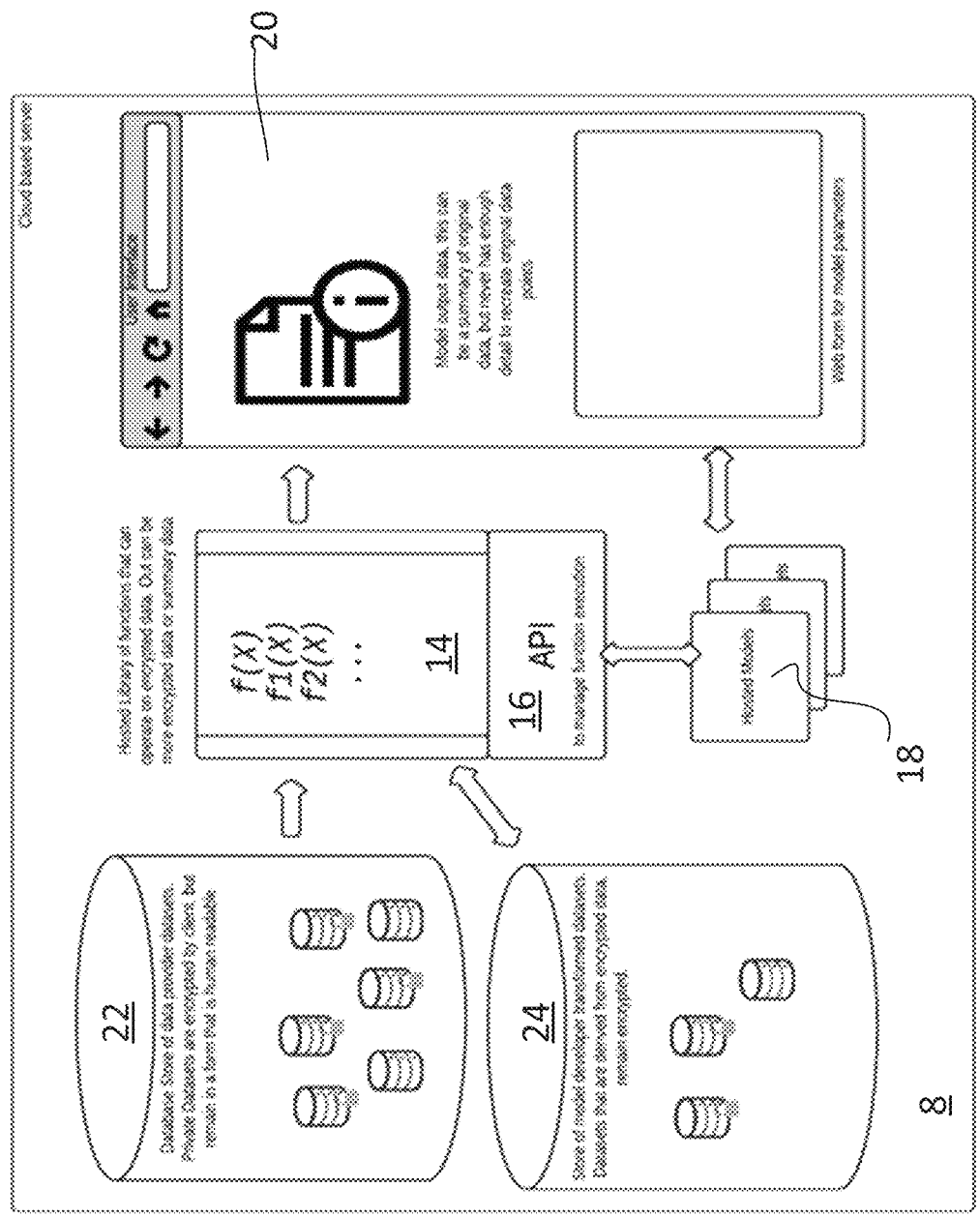
FIG. 2 is an arrangement view of an exemplary server for use in the system of FIG. 1.

The implementation of an exemplary server will now be discussed, with reference to FIG. 2, in which there is a database store 22 containing one or more datasets previously provided by one or more data set providers. Each of the datasets is suitably stored (or retrievable by a user) in a format that allows the user to have the appearance of being able to view the contents through a user interface 20. Thus for example, the data could be stored in a spreadsheet format with associated labels provided as column headings. A user could open\view the spreadsheet using appropriate spreadsheet software.

It will be appreciated from the discussion above that whilst the data may be stored in a user viewable format in which the user can view the form and structure of the data set, the individual data values would represent apparent rather than real data such that the entire data set is not determinable.

In one variation, the data set is stored in a way that the structure and labels are visible but individual data values are encrypted.

Figure 3A:
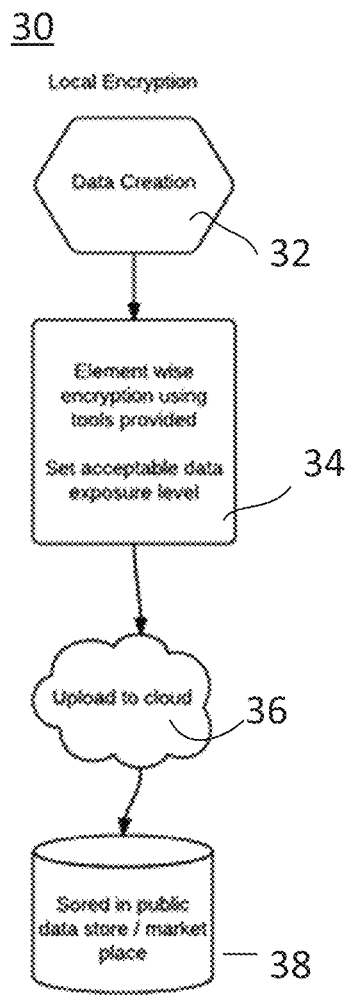
FIG. 3A is a flowchart illustrating an exemplary process by show how a data set provider may provide their data to the server of FIG. 2 using local data set encryption.

An exemplary method 30 by which a user can store a dataset using local encryption, is shown in FIG. 3 A, and commences with a step of data creation 32. It will be appreciated that a data set provider may have created the data set some time earlier (even months or years earlier).

The user then runs a software tool which encrypts 34 the data set. The nature of the encryption is unusual in that the entire data set is not encrypted, thus all of the field labels remain visible. At the same time, a user allows the data associated with certain field labels to be remain visible whilst obscuring others by encryption. The encryption may comprise encrypting one element at a time. In this way, the structure of the dataset remains the same and it is merely the contents of individual elements that are encrypted. An alternative approach would be to de-correlate the data set as explained above.

The user may also be asked to select an exposure level for their dataset. The exposure level indicating the maximum amount of the contents they wish to be exposeable. If the user does not select an exposure level or if this option is not available, the exposure level may default to a predefined level The data may then be uploaded 36 to the server, where it may be made available for use by others 38.

Figure 3B:
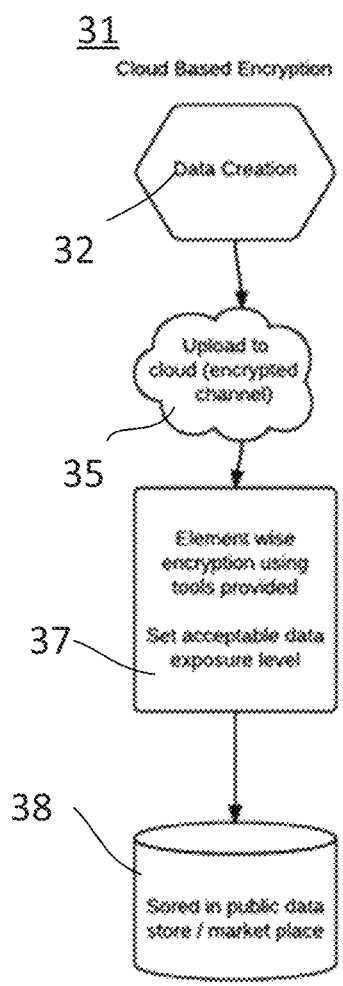
FIG. 3B is a flowchart illustrating an exemplary process by show how a data set provider may provide their data to the server of FIG. 2 using remote data set encryption.

An alternative approach 31 to storing a dataset which has been created 32, as shown in FIG. 3B, comprises uploading the dataset 35 and then encrypting 37 it on the server. As before, the data may then be made available for use by others 38.

The encryption method employed encrypts on an element by element basis so that the dataset itself remains readable albeit that some of the contents are obscured.

Thus for example, consider the exemplary dataset 40 of FIG. 4A, comprising a single table, in which there are plurality of field labels 41, with each field label 41$a$-$h$ associated with a corresponding element in each of the individual datapoints 42 which are shown as the individual rows. During the encryption process, a user can select that certain fields are not encrypted. In this particular instance the index merely represents the row number but this need not be the case. The index is not encrypted. Similarly, in this particular example the user had identified that the data elements associated with the field label Day 41$c$ are also not to be encrypted.

Thus in the resulting encrypted dataset 44, the elements in the datapoints (rows) 46 are individually encrypted and thus appear as numbers albeit that the true value of each is obscure with the exception of those values associated with the field label Day which remain readable. When stored in this form the server, associated metadata for the encrypted dataset identifies which elements are encrypted and identify the key required to decrypt the values. The key may be stored separately in which case the identity is inherent or it may be stored elsewhere in which case the identity allows the server to identify the required key.

It will be appreciated that it is necessary for the encryption method to leave the field labels unencrypted for later use by a user.

In addition to data sets that are provided by a data set provider, the server may also allow users to store transformed datasets 24. For example, the server may allow a user to extract a reduced dataset from a larger dataset and to store this transformed dataset on the server for subsequent analysis. It will be appreciated that this allows a retrieve the reduced dataset at a later date without having to re-perform the extraction process on the larger dataset.

Equally, the server may allow a user to combine datasets to provide an expanded dataset. For example, the server may allow a user to combine a data set provided by one data set provider with a data set provided by another data set provider to form an expanded dataset which may be stored for subsequent analysis.

There is also a hosted library of functions provided on the server. These functions correspond generally to conventional mathematical and statistical functions but are written in a way that they are able to operate on both encrypted (apparent) data sets and real data sets and hybrids of the two where some of the data values (e.g. data associated with certain labels in a data set are real with data associated with the other labels being apparent data).

Thus a user may call a function and request its performance on a particular data set irrespective of the contents, where the called function is able to determine the type of data and then decrypt it or not as appropriate to perform the requested function. It will be appreciated that a user therefore only needs to know the data set of interest, the labels within the data set and the function or function to be performed on it which are requested through the API.

Figure 5:
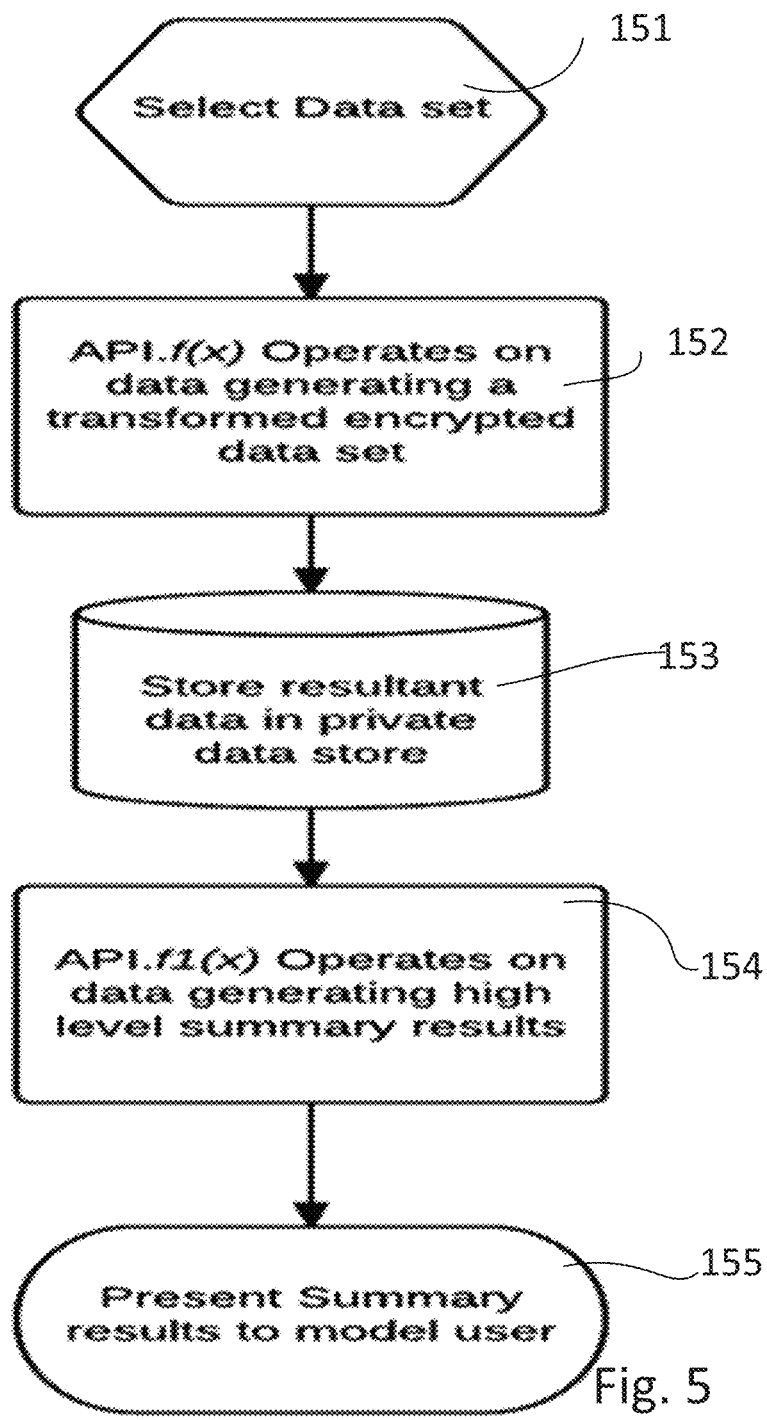
FIG. 5 is a flowchart describing how an exemplary API operates to allow access to the data set generally and illustrates how functions that operate on the data may equally handle encrypted and decrypted data.

The nature of this aspect will now be described with reference to the method 150 in FIG. 5 which commences with a user through the API interface selecting a dataset they wish to analyse 151. This may be as an initial step, i.e. identifying a data set for following steps. The user then specifies a function 152 they wish to be performed by calling that function through the API interface. The resultant data is stored 153 in a private data store associated with the user. Summary results are also generated 154 and presented to a user 155.

In one variation, users are allowed to create models (combinations of mathematical or statistical functions) which they store as hosted models 18 which they can cause to be run on a dataset or transformed data set to provide results which may be viewed/presented through the user interface. The user interface may be provided as a page on a web browser, as an app or otherwise. The results presented may for example be a modified dataset, e.g. the dataset on which the function was performed modified by the function. In the case of the results being a modified dataset, it may be presented as an encrypted (apparent) dataset.

The resulting system is one that employs encryption with controlled API access. The encryption method used allows data holders to encrypt data at an element by element level, so to users of this data it looks like a full data set, with correct column headings and row counts, but individual data points are encrypted. At the same time, the API access system is carefully designed to allow predefined functions that can perform high level actions on the data, such as summary statistics, but cannot be used to iteratively cycle through the data to extract the original data points.

Additionally, data is stored in a data object that cannot be viewed, but can be used like a variable. The API library provides all standard variable operations (such as +, −, * etc) that can be used to work with the data, but only limited display operations. Displaying the data would be restricted to a preview or high level statistical view, for example an histogram.

The system provides for a certain degree of flexibility and thus the level of interrogation allowed of the date is at the discretion of the data owner as will be explained below.

The data function library allows data modelling equally upon encrypted data and unencrypted data equally. This functional library brings together a full tool suite of statistical modeling functions. Functions that operate on the data such as point wise multiplication, would first decrypt the data, then perform the operation then re-encrypt the data, so that the resultant data object again could not be viewed. The system will also facilitate more complex statistical functions such as regression, cluster analysis, etc. which do not require raw data to made visible.

Additionally, the encryption system provides for standard asynchronous encryption where the trusted data repository issues public keys for the data holder to encrypt their data, so they can then publish this data on the repository, and allow users access the data via the API. This encryption system will provide tools to allow data providers encrypt their data with this public key, it performs necessary encryption on the data but leaves column headings in place.

Figure 6:
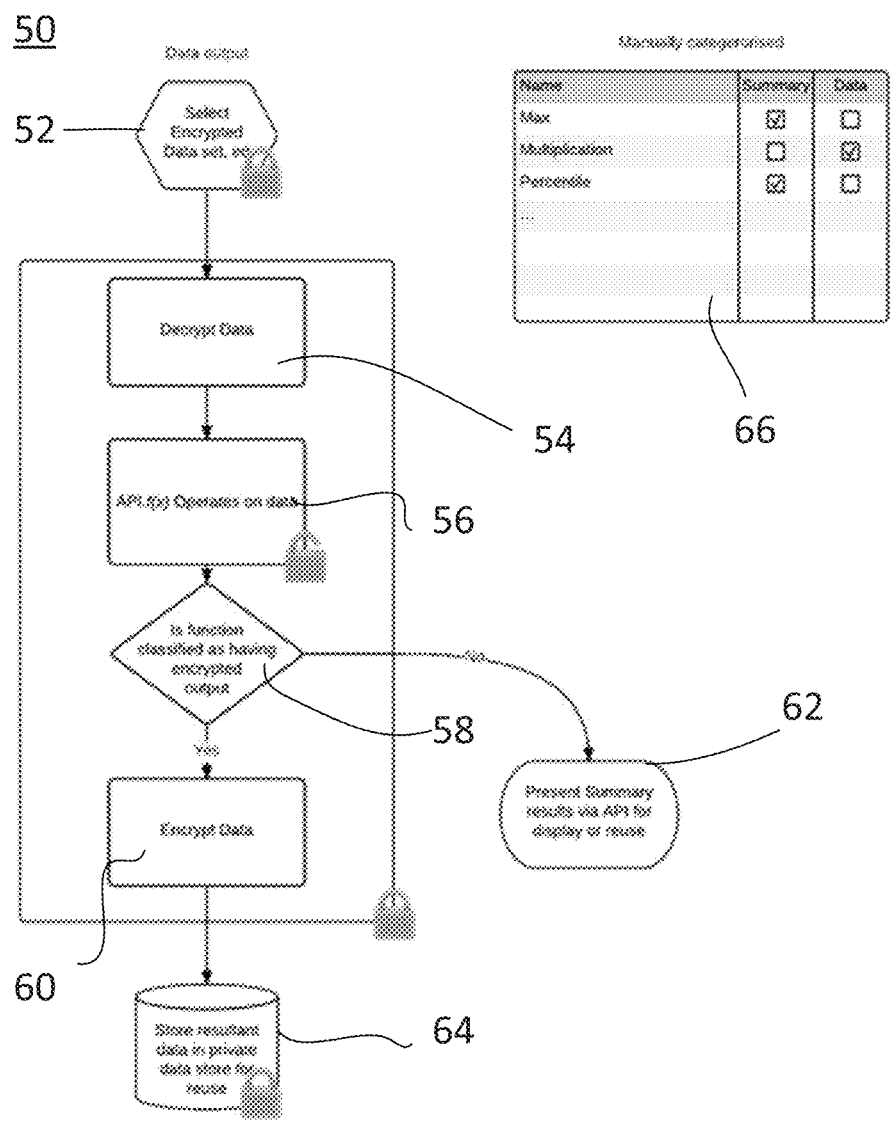
FIG. 6 is a detailed overview of an exemplary process by which it is determined whether access to a result should be given in encrypted or unencrypted form.

The nature of the encryption in the context of carrying out a mathematical function will now be explained with reference to the first exemplary method 50 shown in FIG. 6, which commences with a user selecting 52, the data set they wish to use. The data set is decrypted 54. The API function selected by the user is then run 56 on the decrypted data. A check 58 is performed for the nature of the function (either separately or inherently within the function). Depending on the nature of the function requested to be run by the user, the results may be presented in unobscured form 62 or the resulting data (in the form of a transformed dataset) may be encrypted 60 and stored 64 in a private data store of the user for re-use. The user may have the option to view this data in encrypted form. The nature of the function may be maintained in a table 66 identifying the individual functions and whether the results represent data or summary data, with summary data presented in obscured form.

Figure 7:
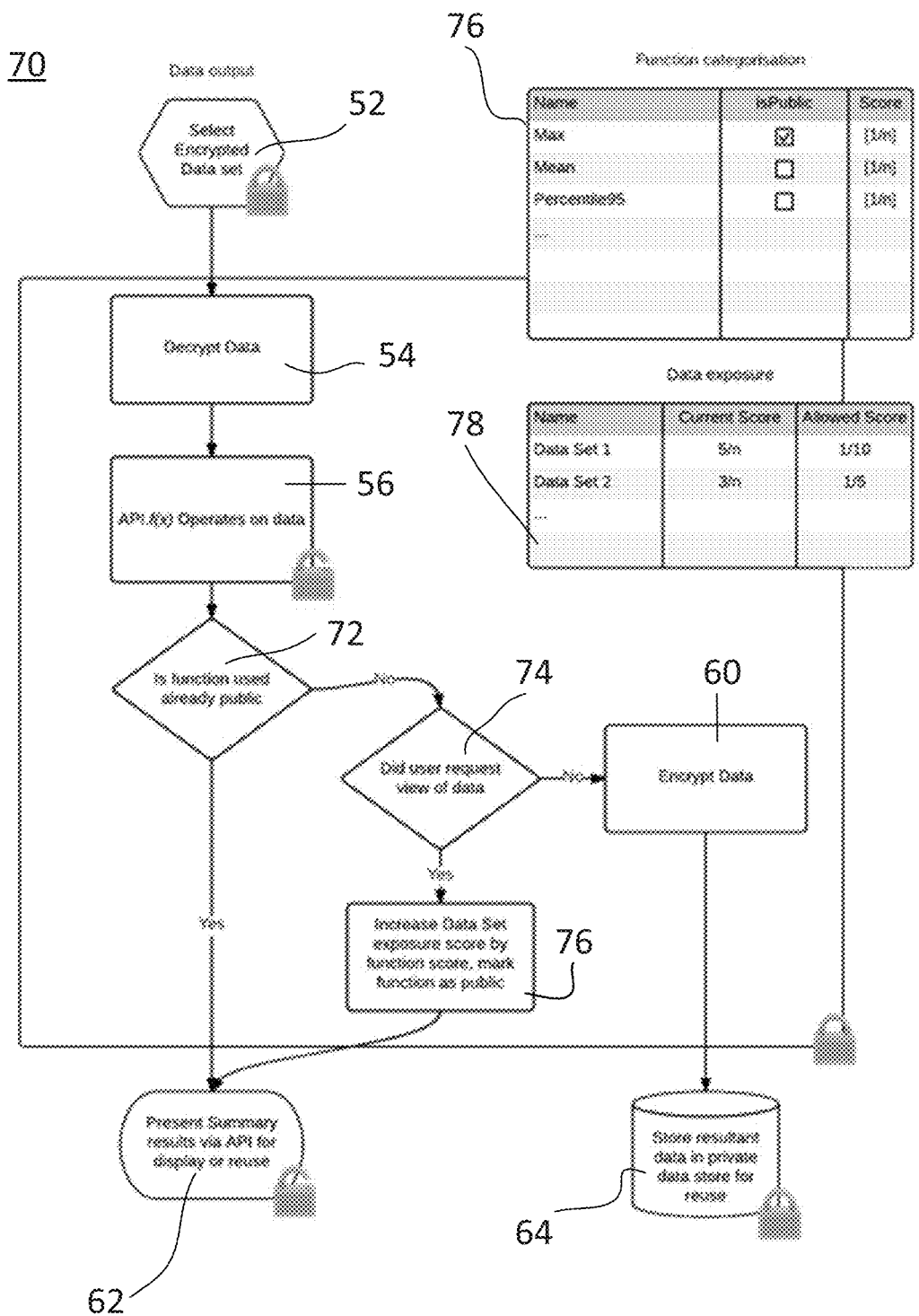
FIG. 7 is another exemplary instantiation where view access is granted based on current data accessed, which provides a detailed overview of the process by which it is determined whether access to a result should be given in encrypted or unencrypted form.

Another approach introduces tracking of exposure levels. The method 70, as shown in FIG. 7, commences as before with the user selecting a dataset 52 and the data set being decrypted 54. As before the user can cause a function to be applied 56 to the dataset by means of the API.

A determination 72 is then made as to whether the exposure level for the dataset has already been reached, or stated differently has the limit of data from the dataset to be disclosed to users been reached. If this is the case, the user is only presented with summary results. If not, a determination 74 is made as to whether the user actually requested to see the results. For example, the user may merely be performing the function to provide an intermediate dataset for carrying out other functions and have no interest in viewing the data as such at this stage. In which case, the resulting dataset is encrypted 6 and stored 64 in encrypted form matching that of the parent, i.e. those fields which were encrypted remain so and those that were not remain unencrypted.

If the user did request sight of the results, the exposure score is increased 76 and the function marked as public. With summary results presented to the user 62. As discussed below, a history of functions called on datasets and subsets thereof with exposure scores not increased where the same function is performed on the same data a second time.

Suitably, the encryption system is configured to allow embedding of watermarks in the data. So when users are granted access to the data, subsequent sharing of that data can be traced back to the specific 3rd party user it was shared with. The use of correlation/decorrelation (discussed below) may also be used as a watermark, i.e. that different de-correlations are used with different users.

Controlling what functions can and cannot be performed on the raw data through strong encryption and security measures, and designing those functions so that the details of the underlying data cannot be found, or reverse engineered, provide confidence to data owners that the value of their data will not be lost through use of the system but indeed on the contrary provides a way for data owners to sell their data whilst maintaining it secret. This allows for example for the effective creation of a data marketplace.

Functions within the system may be categorised as either "summary statistics" or "functional". Summary statistic functions allow result data to be display unencrypted. Examples of such summary statistics may include operations such as limited mean, percentile, or select distinct. Functional operations will keep data encrypted. Consideration will be given to whether the data is labeled by the provider as either continuous or categorical so that sensitive data will always remain encrypted.

Additionally, the present application provides a novel encryption scheme which allows certain properties of the original data set to remain present in the encrypted data. Thus for example, the max, min and potentially mean of an unencrypted data set would be the same in the corresponding encrypted data set. More particularly, this effect may be achieved by reducing n (the max size of the cypher) to correspond to the max size of the original data set. This may be done by introducing an offset.

Data Exposure/Function Classification

As explained above, every time data output is presented in unencrypted form to a user of that data, something about the original data is revealed. Even if the function only reveals a single data point of a massive data set. In the most simple form of this problem, where a data set contains n values, calling a minimum function potentially reveals 1/n values, if you remove that minimum and call the minimum function again you get the second smallest value. repeat n times and you have entire data set.

There are two types of function that can operate on the data, a map function that converts the n data points to m where m is greater than 1 (and may indeed may be equal to n, such as a multiplication or sort) and a summary statistic function, which is defined as a function which produces a single element.

In one embodiment of the invention, the output of all map functions remain encrypted if the original data is encrypted. In contrast, summary functions present unencrypted data. It will be appreciated that repeated use of summary functions ultimately could be employed to reproduce the data set.

To account for this the system makes provision to allow a data provider to set an exposure level. This could for example be done as part of the process of providing the data to the server. The exposure level allows a data owner to specify the amount of exposure they would be willing to allow on the data.

For example with a data set of 100,000 data points they might allow 2% exposure and when this limit was hit, no new summary functions could operate on the data.

Thus the number of summary actions allowed on the exemplary 100,000 data points might configured as 2,000. It will be appreciated that this does not necessarily reflect that the identify of 2,000 individual data points have been revealed but that the nature of 2% of the 100,000 data points may be reasonably well defined. The system is configured to track the number of summary actions performed by a user on a data set and once the set exposure level has been reached, further analysis is prevented. In this context, summary actions which are repeated may not be counted since the repetition of the same function on the same data never exposes more of the data.

The exposure level may also be arranged to apply to any filtering of the data. If for example, the data set of 100,000 was filtered down to a sub set of the data of 10,000, still only 2% of this data set of 10,000 could be exposed (i.e. 200 summary results. Once a summary function is called on the data or sub data set once, this function is hence marked as used for that data set and the exposure level of the data recorded.

The exposure level may be determined in a number of a different ways. As an example, in a first way, the exposure level may be determined with respect to the data user and no single data user is allowed perform summary functions in excess of the exposure level, this may be referred to as a user exposure level. The advantage of this approach is that all data users would be treated equally.

The disadvantage is that several users could conspire together with each reaching their individual maximum user exposure level but the aggregate exposure level being considerably higher when summary results obtained by each user are combined together.

In an exemplary second way, the exposure level may be determined with respect to the data set. In this approach, the exposure level is set with respect to the data as a whole not the user, this is referred to as global exposure level. Thus if the example above applied and a global exposure level was employed and a first user had used 8,000 of the available 10,000 summary functions, only 2,000 summary functions would be available to another user.

A further exposure level may be referenced to users within a group. For example, users from the same company, may be treated as a single group. Such an exposure level in this context may be referred to as a group exposure level.

It will be appreciated that there may equally be other types of exposure level defined.

Equally, it will be appreciated that different limits may be set for each.

Thus for example, an individual exposure limit may be set at one value, e.g. 5%, with a group exposure limit set higher, e.g. 10% and a global exposure limit set higher again e.g. 20% and where any one type of exposure reaches the corresponding limit, further access or exposure is prevented. In this case, it will be appreciated that the access may equally be with reference to the exposure limit in question, for example if a user performs a series of analysis that causes them to reach the user exposure limit, that they may be denied further access. However, other users who have not reached their limit may continue. Similarly, if a global limit is reached, then all users may be prevented gaining access.

At the same time, exposure levels and limits may be assigned to an overall data set or for a subset of data values within a dataset (e.g. each column of data may have an exposure limit).

To prevent the first user of the data, using up all the available exposure, calling several variations on the min function. Functions may be ordered by their usefulness with each function being allocated an exposure value. For example, a Min function might be given an exposure level of 10 and in contrast a count function might be given an exposure level of 1. In operation, as functions are called, the overall exposure count is increased in accordance with the exposure level for the functions as they are counted. Once a total is reached corresponding to the exposure limit, access may be limited as previously explained.

In a first approach, the functions are ordered manually, i.e. a user pre-determines a count or score for particular functions. In this approach, the person performing the ordering uses their judgement to set the order. In another approach, the order may be determined by monitoring user usage patterns of the functions in the libraries and ranking them accordingly. It will be appreciated that a combination of the two approaches could be employed, for example performing the ordering using a best judgement approach which is refined by the latter approach of monitoring usage patterns.

In another approach, different functions would have a different cost associated with them, if they had been used already, the cost would be low, if they are used for the first time the cost would be higher. And the cost would be calculated to be inversely proportional to the usefulness of the function as defined in the last step.

In general, the exposure level may be defined as:

Exposure, $E = F_n/n$

Where $F_n$=the number of function calls allowed on the data set and n is the size of the data set. It will be appreciated that certain functions may not result in any exposure of data and so different functions may be weighted as to how may nominal function calls, any given function equates to.

So, if there are 100 data points in a data set, n would be 100, and an owner only wants to allow 2% exposure (E=2%), it would be appreciated that only 2 function calls ($F_n$=2) would be allowed.

It will be appreciated that n is determinable from the dataset and corresponds to the number of datapoints. In a spreadsheet representation, a datapoint would equate to a row of data or the value of a single value in one column of such a row.

Where the exposure level is set as a global limit across all users of the data set, the system may specify a usage weighting to different functions which in turn may be used to define an order for function usage. For example the order of function calls could be, as an example, where mean has the lowest weighting and potentially exposure cost:

1. Mean
2. Standard Deviation
3. Min
4. Max
5. Median
6. P05
7. P95
8. P02.5
9. P97.5
10. etc. . . .

In the example above, therefore as the user can compute the Mean and the Standard Deviation on the 100 data points and that is all. If the data owner allowed a 4% exposure, this would allow 4 measurements on the data (in total) so the user could compute the Mean, Standard Deviation, Min and Max of the data.

If the user can filter the data down to a small subset of data using some data feature, the n is reduced to the size of the filtered data, e.g. if the 100 data point data set is reduced to 10 data points then n=10 and in the case of E=2%, Fn becomes 0.2 which (as it is <1) means no measure is allowed on the filtered data set.

Additionally, it need not be a simple summing of exposures. In particular, it will be appreciated that every function exposes the original encrypted data to a different level, some are straight forward such as minimum, gives 1/n, plus it shows the min (so it gives slightly more information than 1/n). In contrast, a histogram function exposes an amount between 1/n and n. However, where functions are used in combination, it is possible that the functions give more information than just their individual exposure scores. Accordingly, the exposure level may be determined using an algorithmic and systematic method, which varies depending on the combination of functions employed.

Figure 12:
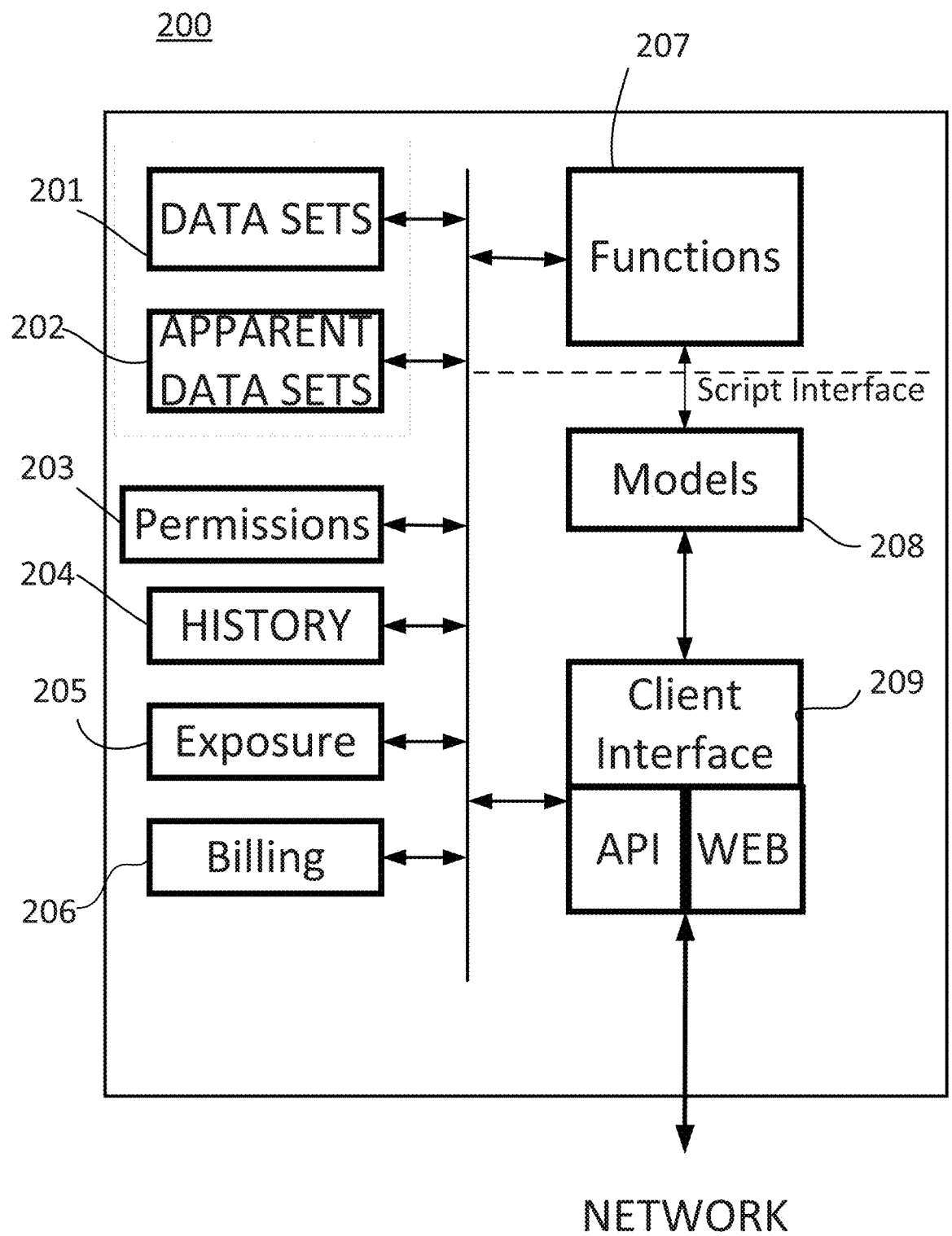
FIG. 12 is a block diagram illustrating functional elements that may be configured with the application server of the system of FIG. 11.

A more detailed implementation 200 will now be discussed with reference to the arrangement of a system functionally as shown in the block outline of FIG. 12. The system which may be implemented on a single computing device (e.g. a server) or distributed amongst several computing devices. The system is connected to a network and provides access to users on client computing devices through a client interface 209. The client interface may comprise a web interface and/or a programming interface such as an application programming interface (API).

The client interface in turn provides access to different modules within the system. These modules may comprise data or functionality or a combination of both. Thus the system provides for models 208 which allows a user create one or more models which in turn through a scripting or similar interface allow execution of functions 207. The models in turn may detail which dataset is to be operated upon by the functions and so there is a dataset function 201 for maintaining these. For ease of explanation, also shown is an apparent dataset function 202. Certain functions and views by users may operate using same. A permissions function 203 is provided to identify the permissions of individual users or groups. These permissions may indicate who the owner of a model or dataset is and which users are permitted to amend/read/write/use same. The permissions may also indicate whether a user is authorised to view the data within a dataset or only to view an apparent form of the dataset.

A history function 204 may track the activity of individual users and/or functions called upon datasets. An exposure function is included to calculate the exposure resulting from any functions called upon a dataset. A billing function may also be included allowing a dataset owner to charge for analysis of their dataset. Such a billing module may operate to determine the charge using one or more approaches. For example, users may simply be charged based on the run-time duration of their model, the exposure calculated for their model, or a per use basis or a combination of these approaches.

The client interface will now be explained with reference to an exemplary browser interface, in which a user on client computing device types in an uniform resource locator (URL) in their browser window and they are taken to a webpage.

The initial webpage presented may require a user to login to the system using a security method, for example using security credentials such as a username and password. Once their security credentials have been confirmed, the user may be presented with an graphical user interface which allows them access to the functionality of the system.

Figure 8:
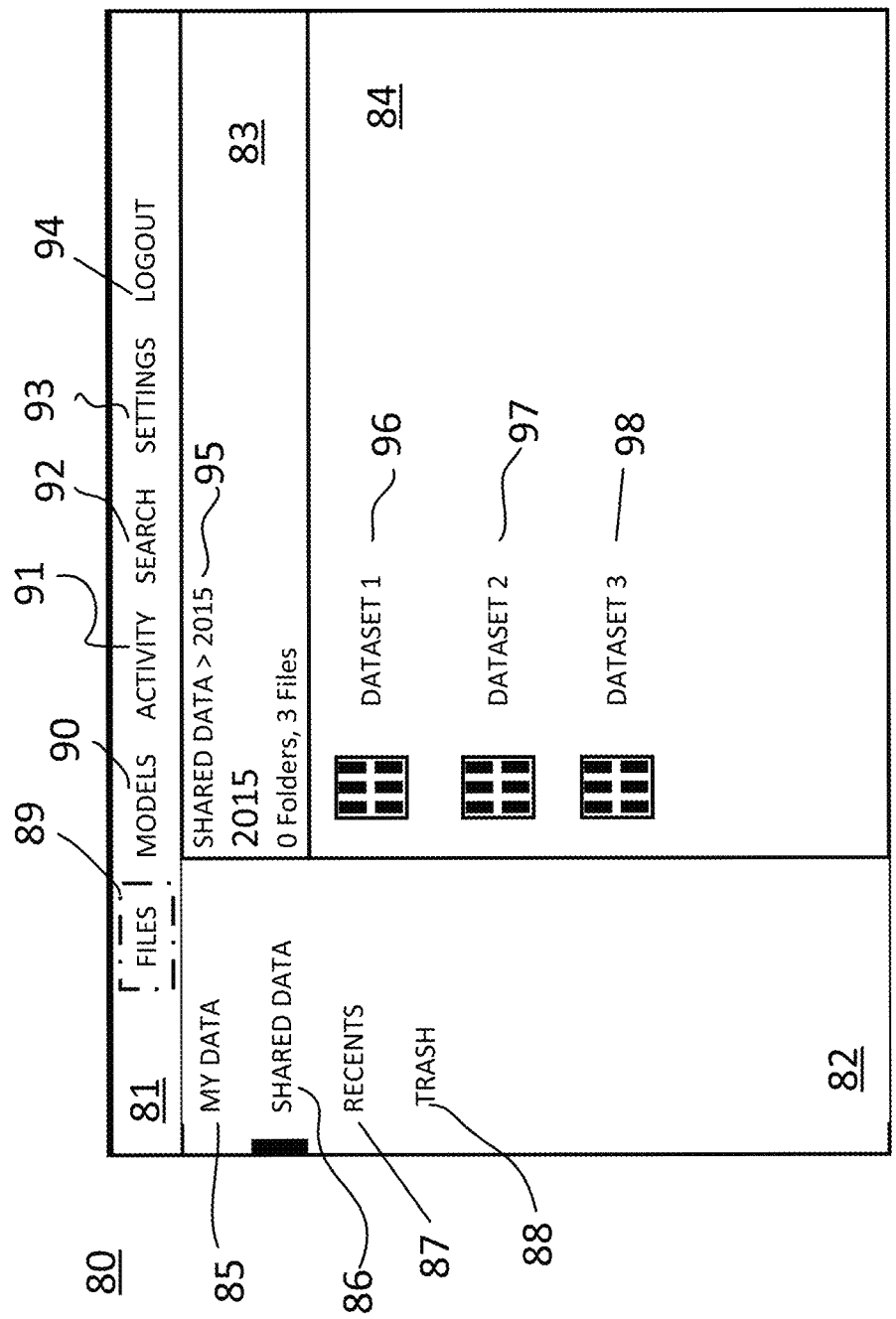
FIG. 8 is a view of an exemplary graphical user interface according to another aspect of the application.

An exemplary such interface 80 is presented in FIG. 8. The interface has a number of different tabs at the top, indicated as Files 89, Models 90, Activity 91, Search 92, Settings 93 and logout 94. The user may click on the tabs. The client interface responds with a different view to the user depending on the tab clicked.

In the view of FIG. 8, the user has clicked the Files tab 89. As a result of which, a files view has been presented to the user. The files view in turn is broken down into three separate sub-windows or views. The first window 82 on the left hand side presents root folders 85, 86, 87, 88 that are available to a user. There are two primary folders of importance presented to the user. The first folder is called MY DATA 85. This folder is used to allow a USER to upload and store their own datasets.

A second folder is SHARED DATA 86. This folder represents datasets that have been made available by others. In each primary folder, there may be one or more subfolders. A second sub window 83 indicates where the user is at any one time.

Thus in FIG. 8, the user is in the SHARED DATA folder as highlighted by the black mark beside SHARED DATA in the first sub-window. In the second sub window, it is identified 95 that the user is in a sub-folder of SHARED DATA named 2015. The third sub window 84 shows the contents of the location or file identified in the second sub window. Thus in the exemplary folder 2015, there are 3 datasets 96, 97, 98 represented: DATASET1, DATASET2 and DATASET3.

The client interface is suitably configured to employ conventional interface techniques. Thus clicking with a left mouse key on an identified file may cause the highlighted file to open and right clicking may present the user with a number of alternative functions available. These functions superficially would appear similar to a conventional file system, for example functions might include copy, paste, rename, move, properties etc. Similarly, drag and drop functionality may be provided. In this way, a user may select one of their files and drag it to trash to delete it. As will be discussed later, a file permissions arrangement may be provided to limit the functionality of different users.

However, whilst the user interface functions may have the appearance of operating conventionally, they do not all necessarily do so.

Figure 9:
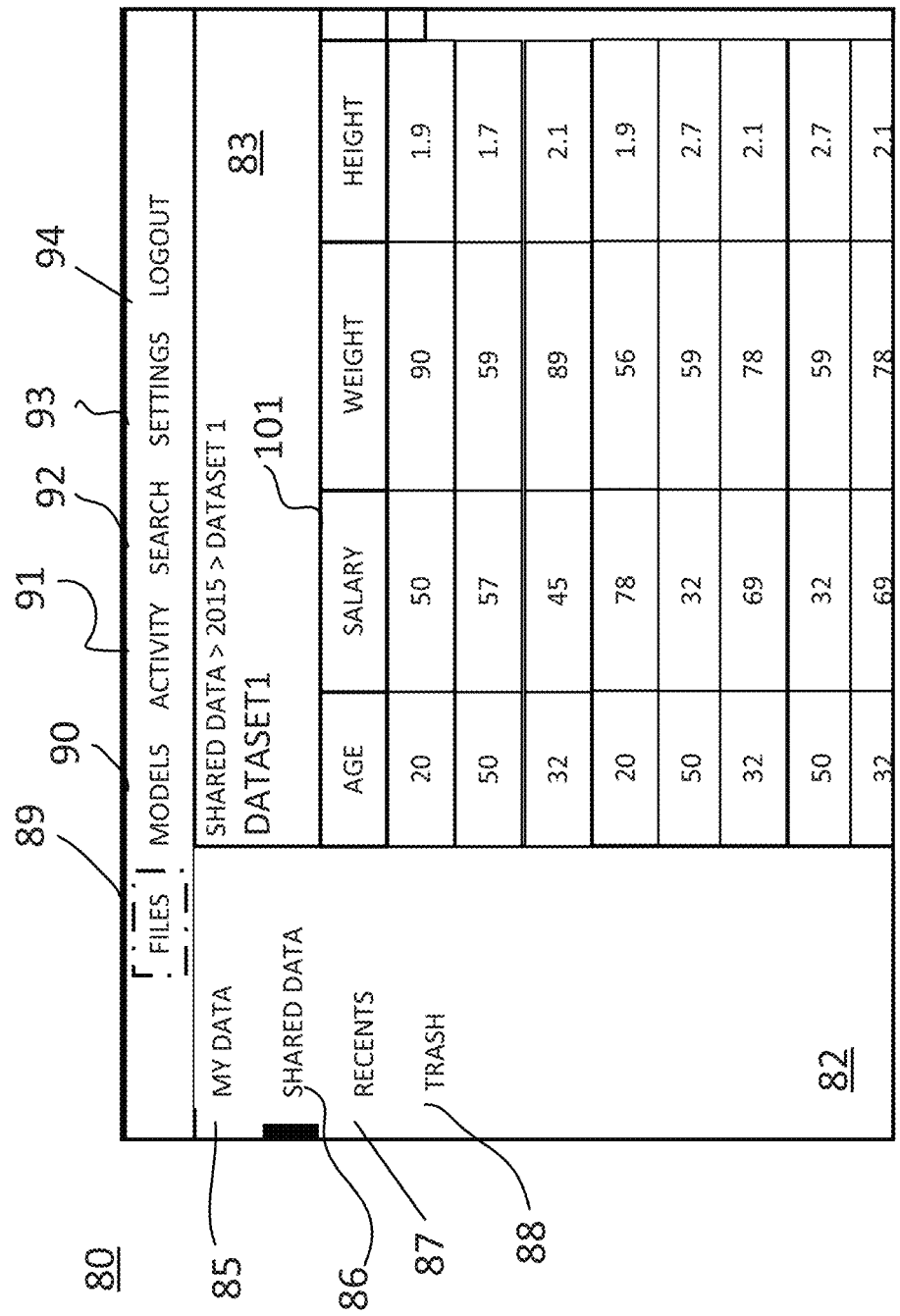
FIG. 9 is a further view of the graphical user interface of FIG. 8 in a different state.
Figure 10:
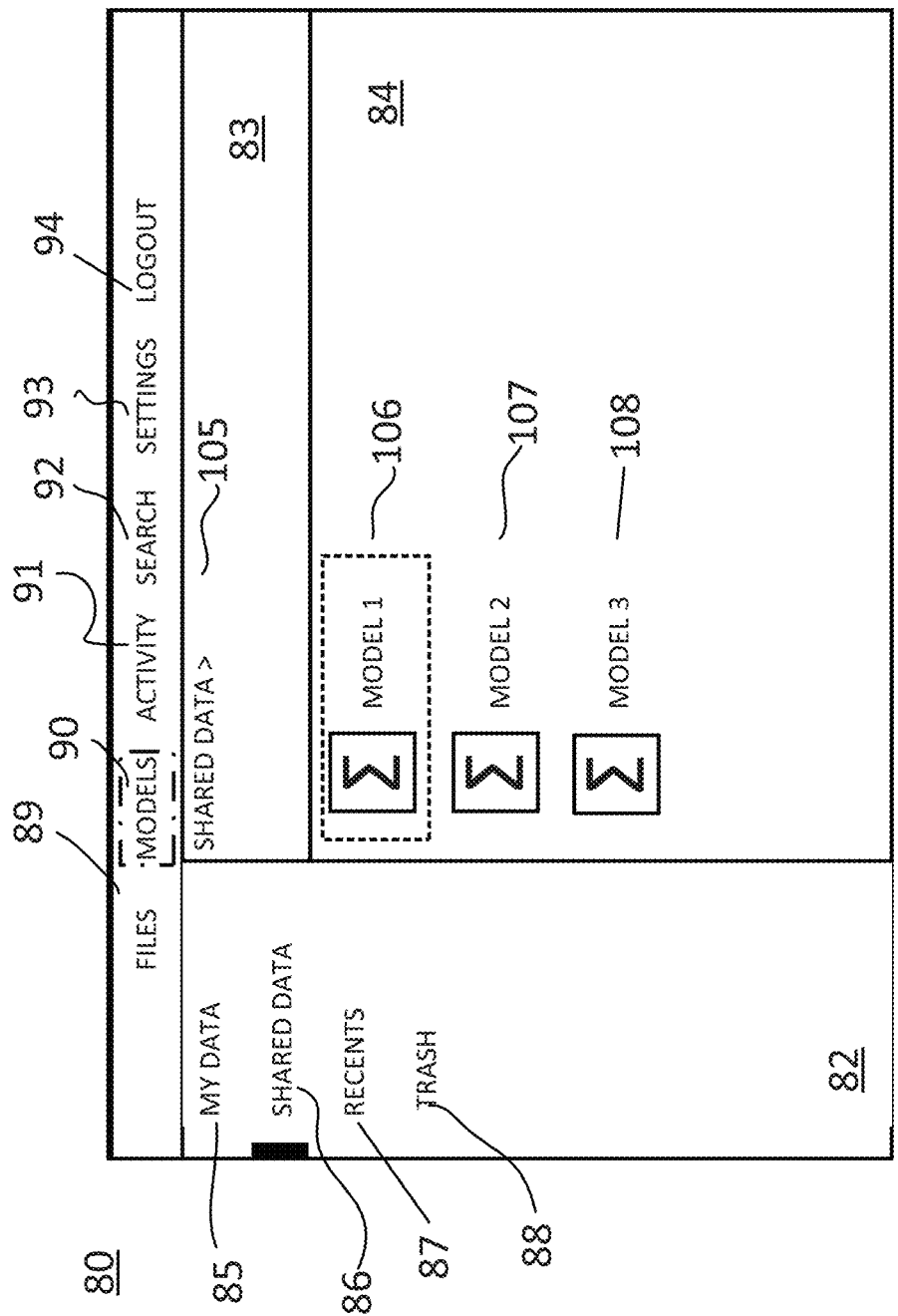
FIG. 10 is another view of the graphical user interface in another state.

Thus, in the case of opening a dataset, e.g. by left clicking on the icon for a dataset, the user is presented with a new view of the graphical interface 80 in which the contents 101 of the dataset as shown in FIG. 9, in which DATASET 1 of FIG. 8 has been opened in the third window. At the same time, the information in the second window 83 has changed accordingly.

DATASET 1 may be seen to be represented in tabular format and contain 4 columns which are labelled AGE, SALARY, WEIGHT and HEIGHT. For all intents and purposes it resembles a spreadsheet or table. A scroll tab is shown at the right hand side allowing a user to scroll down through the data values in DATASET1.

However, in contrast to conventional interfaces, the data values shown may not be the real data contents of DATASET1 but rather only have the appearance of being real data values. The true data values may be obscured. Thus if the permission for the dataset is that it is not to be exposed, the data values presented are only apparent data values and the representation shown is not an accurate depiction of the dataset.

A visual cue may be presented to the user to identify that the data shown is only apparent data. For example, the font colour or cell shading may be a different colour when real/apparent data values are shown.

A charting function may also be provided allowing a user to chart the data of dataset. Thus for example, a user might be able to select a dataset, identify a chart type of interest and the columns to be charted. However, the data employed may be that of apparent data rather than real data. Although, such a charting functionality is more useful in a situation where the apparent data is not de-correlated from the real data so that although a random variation may have been introduced that a general shape of the data may be considered.

The owner of the dataset may have set an exposure level for the entire data set, i.e. all data values are shown as apparent values or the owner may have set particular columns of data as having an exposure level. Thus in the case of the labels shown a user might have decided that the AGE values were allowed to be exposed but that the other values of SALARY WEIGHT and HEIGHT were not to be exposed and accordingly a user viewing the data set would see only apparent values for these.

As will be discussed below, each DATASET may in fact be stored in two forms. The first form is the actual DATASET as stored by the owner/creator of the dataset and a second being an apparent DATASET which contains values which only have the appearance of being real data values. Superficially, this may appear pointless. However, as explained above it has clear value.

Alternatively, the correlation-de-correlation/encryption-decryption information may be stored allowing for a real dataset to be recreated from an apparent and vice versa.

An owner of a given dataset would be presented with the real dataset, whereas another user without such permission would be presented with the apparent dataset. As described above, different users may be presented with different apparent datasets. One advantage of this is that the apparent data set may be linked with a user and the correlation or encryption acting as a watermark associated with the user.

Equally, a user may be able to create their own datasets from another user's dataset. Thus for example, a user might select just two of the columns and then use a copy to new data set function to copy these to create a new data set. Thus whilst a user might believe they were creating a new dataset, they would in fact be creating two new datasets—a real one representing the actual values of the dataset as copied from the original and an apparent one containing apparent values as copied from the apparent dataset. However, in doing so the permissions would follow from the original data set. Accordingly, if the user who created the new data set was not the owner, then when viewing the newly created dataset they would be presented with apparent data values. In contrast, if the person who created the new data set was the owner of the dataset from which it was copied they would get to see the actual data values. Equally, the owner of the dataset may be allowed to change the permissions on the dataset whereas others may not.

Equally, a user may decide to share their data with one other user, a group of users or all users. Such functionality will be familiar to those who have used file storage services such as BOX, DROPBOX etc.

A further tab on the top of the client interface provides access to models and so is called the MODELS tab 90.

When a user clicks on the MODELS tab 90, they are presented with a similar view to that of the FILES tab. As before there is three sub-windows 82, 83, 84, in which a first window contains the same general labels as before, i.e. MYDATA SHARED DATA RECENTS and TRASH. However, in contrast to the user being presented with a file directory in the second window 83 with DATASETS they are presented with a file directory 105 containing data models the contents of the directory selected 105 are shown in the third window 84. In the exemplary interface shown in FIG. 11, there are three models 106,107,108 shown MODEL 1, MODEL 2 and MODEL 3 which are as identified in the first and second sub-windows as being stored within the SHARED DATA folder. A user may select a MODEL, using their mouse. Clicking on a model allows a user to view the contents of a MODEL.

A model is one or more functions which may be combined together to operate on one or more datasets. In one implementation, a MODEL is a script written in an appropriate language, e.g. using the PYTHON programming language. A user left clicking on a model may be presented with the contents of the script.

A user right clicking on a model may be presented with an option allowing them to run the model.

The model may identify within itself the dataset on which the model is to be run. Alternatively, it may provide an interface allowing a user to identify the dataset on which the model is to be run.

The models are suitably intended to be conventional so that users would have immediate familiarity. Thus a user could create a model on their own computing machine and run it locally using a locally stored dataset before uploading it to the system.

Thereafter a user can upload their model onto the system e.g. by right-clicking on a folder and selecting an upload function.

The system may include a security feature which would scan the code of any model being uploaded to detect the present of malicious or otherwise unwanted code prior to allowing it be stored for use on the system.

In this context, the use of certain functions may be prevented and the security feature may look for such functions. Where such functions are found, the system may provide the user with a warning message and prevent storage of the script. Such a warning may indicate the reason for the failure.

Alternatively, the code executing such functions which might present a possibility for a malicious use may be rewritten to have such a possibility removed.

Once uploaded a model may be selected by a user to be run. However, the interpreter or other functionality running the model is not a conventional one but instead is written to run with the system.

Accordingly, any given function may be replaced with an alternative function which is re-written to accommodate the unique approach of hiding data from users of the system. The replacement functionality takes note of the users permission with respect to the dataset and determines whether the results should be exposed or not, i.e. whether the user should be permitted to see the result or an apparent result.

In one simple implementation, the level of exposure is determined with respect to the volume of data that is output from the model, i.e. a single value will have a lower exposure than 100 values.

In another implementation, the user is allowed to operate the model in one of two modes—apparent and real. Initially, the system is configured to operate in apparent mode. In this mode, when a user identifies a dataset, the interpreter is configured to operate on an apparent dataset corresponding to the dataset. The results of the model are then presented to a user. Accordingly, a user can refine their model and run it repeatedly without there being a risk of exposing the data. If the user switches to the real mode, the system is configured to switch to using the real data set.

In this context, the system may be configured to present the user with a cost for running the model before they proceed. The cost may be charged to a users's account using an accounting function on the system, techniques for which would be familiar to those skilled in the art. The cost may be determined based on the nature or volume of data being output from the model. It will be appreciated that this may have been determined when the model was employed on the apparent data set. Thus, in one example, the cost may be equated to the exposure resulting from the running of the model on a dataset.

Separately, an exposure calculator may operate in the background to monitor the current and cumulative exposure on a given dataset or subset of data values within a dataset. This exposure calculator may trigger a halt to any model where a pre-determined exposure limit has been reached. Alternatively, if an exposure limit is reached, the data presented may be apparent data rather than real data.

It will be appreciated that a significant advantage of the system described herein is that a company can make its datasets available locally within the company using the present system or via a remote connection to allow employees or third party consultants perform an analysis of their datasets whilst at the same time, the data comprised within the datasets is obscured preventing an individual from copying the data and passing it on to a third party.

Figure 11:
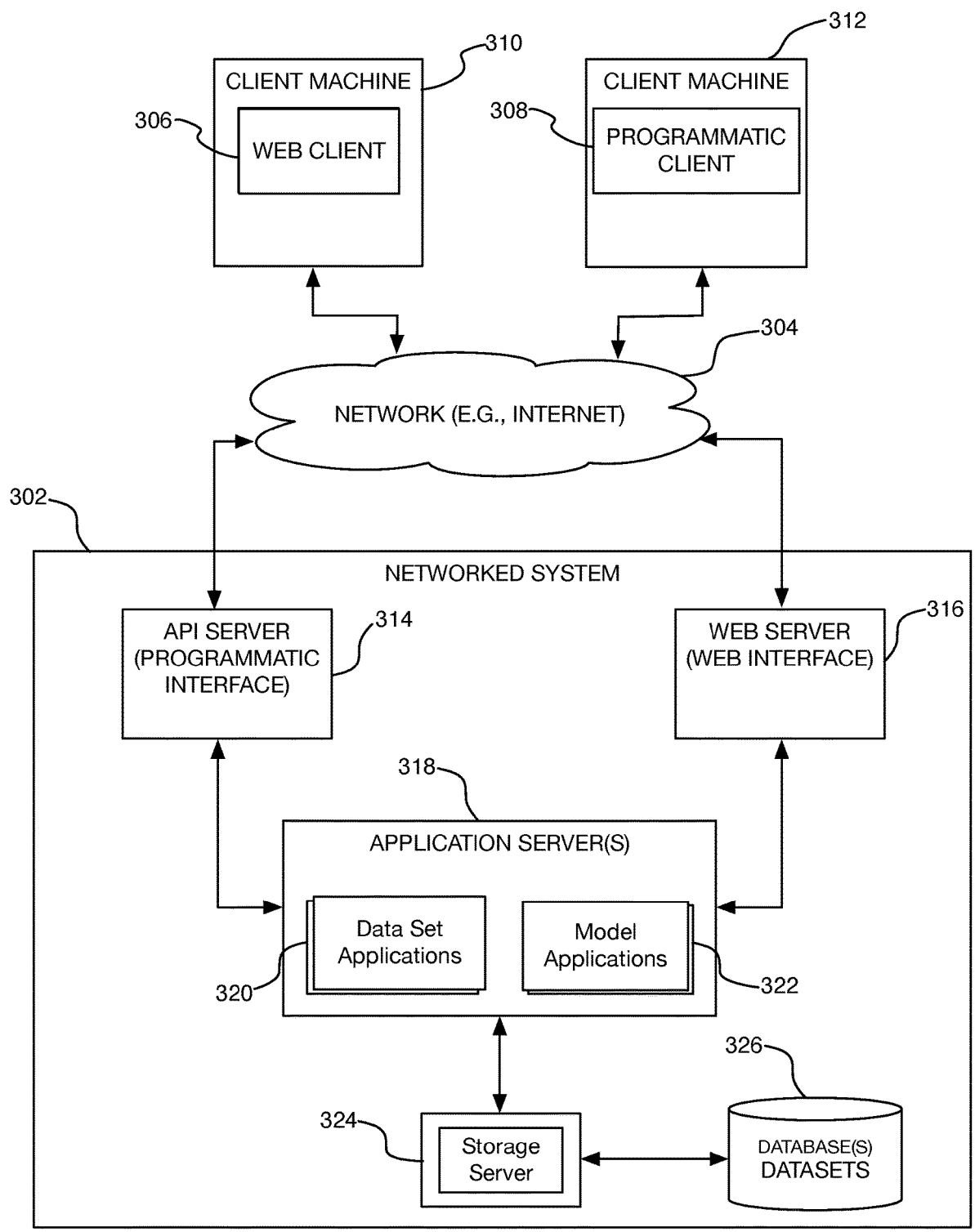
FIG. 11 is a view of system arranged according to an aspect of the application and which may be employed to provide the graphical user interface of FIG. 8.

FIG. 11 is a network diagram depicting a client-server system 300, within which one example embodiment may be deployed. A networked system 302, in the example forms of a network-based data set analysis system, provides server-side functionality, via a network 304 (e.g., the Internet or Wide Area Network (WAN)) to one or more clients. FIG. 7 illustrates, for example, a web client 306 (e.g., a browser, such as the Internet Explorer browser developed by Microsoft Corporation of Redmond, Wash. State) or CHROME from Google Inc., and a programmatic client 308 executing on respective client machines 310 and 312.

An Application Program Interface (API) server 314 and a web server 316 are coupled to, and provide programmatic and web interfaces respectively to, one or more application servers 318. The application servers 318 host one or more Data Set applications 320 and Model applications. The application servers 318 are, in turn, shown to be coupled to one or more storage or database servers 324 that facilitate access to the datasets and one or more databases 326. Such databases may be employed to store information regarding to users, permissions, history, files. They may also be used to store the models and potentially the datasets, but more generally these are preferably left as files which are stored separately.

The DATA SET applications 320 may provide a number of dataset functions and services to users that access the networked system 302. The MODEL applications 322 may likewise provide a number of model services and functions to users. The DATA SET applications 322 may allow users access to functionality with respect to data sets stored on the system. Thus a user may use the DATA SET applications to upload, view, move, copy and change permissions (if permitted) on individual data sets. At the same time, the DATA SET applications may allow the owner of a given DATA SET to share it with other users, either generally or with selected individuals or groups. Such sharing may provide the owner with the ability to set an exposure level for the data set being shared or for an exposure level to be set for specific columns of data within the data set. As described above, these exposure levels may be set as a series of different exposure levels in respect of individuals, groups or universally. At the same time, the data set applications may allow an owner to set a price for access to their data. Such a price may be determined with respect to a number of functions including, analysis time, quantum of data output, or the potential exposure of the data set.

In this context, where an owner determines that they wish to limit the exposure of their data to a value of 20% and wish to be receive a payment of 10,000$ for this, then the system could be configured to equate each 1% of exposure as equating to as 500$.

Similarly, it will be appreciated that the Model Applications allow a user to perform similar functions to those of the DATA SET. In this context, The MODEL applications 322 may allow users access to functionality with respect to models stored on the system. Thus a user may use the MODEL applications to upload, view, move, copy and change permissions (if permitted) on individual models. At the same time, the MODEL applications may allow the owner of a given model to share it with other users, either generally or with selected individuals or groups.

While the MODEL and DATA SET applications 320 and 322 are shown in FIG. 11 to both form part of the networked system 302, it will be appreciated that, in alternative embodiments, the MODEL and DATA SET applications 322 may form part of a separate service that is separate and distinct from the networked system 302 on which the remaining elements are provided.

Further, while the system 300 shown in FIG. 11 employs a client-server architecture, the present invention is of course not limited to such an architecture, and could equally well find application in a distributed, or peer-to-peer, architecture system, for example. Similarly, the various MODEL and DATA SET applications 320 and 322 could also be implemented as standalone software programs, which do not necessarily have networking capabilities, this may be useful in an internal company environment.

The web client 306 accesses the various MODEL and DATA SET applications 320 and 322 via the web interface supported by the web server 316.

Similarly, the programmatic client 308 (if provided) accesses the various services and functions provided by the MODELS and DATA SET applications 320 and 322 via the programmatic interface provided by the API server 314.

In one approach, the server makes available an Application Programming Interface having a conventional set of functions allowing an operator to operate upon a set of data. In this approach, the user includes function calls to the API within their own code. These function calls use names which would be familiar to those performing analysis. Thus for example, the function calls may correspond for example to those identified in the Python libraries.

Whilst, to the user the function call may appear as a genuine function, the Interpreter on the server side includes functionality which limits the exposure of data within a data set.

This may for example include the implementation described above using encryption. Equally, the data set need not necessarily be encrypted but the interpreter operates to limit the exposure of data to users performing function calls.

A more functional representation of the various functionality and elements within the system which may be implemented on the networked system 302 is as discussed previously illustrated in FIG. 12. As discussed above, there is a client interface which may provide both API and Web access to the server. There is a MODELS function allowing for models to be created, stored, modified, uploaded, shared and executed. In turn there is a scripting interface which is employed to execute the models and giving access to a function a library.

Separately, the system provides for the creation, storing, modification, uploading and sharing of data sets. As illustrated, each data set may be stored in two forms real and apparent and to one to which access is granted will depend on a number of factors, including the settings of the owner of the dataset, the exposure and the settings\choice of the user. In this context for example, a user might elect to use an apparent data set in preference to a real data set to test the functionality of their model where there is a charge for accessing the real dataset and none for the apparent dataset. Similarly, a company might allow an external consultant access to the apparent dataset to develop a model, whereupon the external consultant could share his model with the company thereafter. Nonetheless, the external consultant could still extract meaningful measurements as the real data set could still be used by the consultant as long as the exposure limits had not been reached.

In this context, the system may have a permissions function which maintains the permissions associated with different users, models and datasets within the system. Such a permissions function will generally be similar to those which be used for file stores and would be familiar to those skilled in the art and would include whether for example a file is read only or read/write. Additionally, however it would include additional permissions indicating for example whether a file is an apparent or a real data set. A history function may be employed to track the history of users, e.g. when datasets were uploaded, copied or deleted. More specifically, the history function may be employed to track/record the functions performed on datasets so that an analysis of previous requests may be performed.

An exposure function may be provided to determine the amount of data that has been exposed and to prevent this amount exceeding one or more limits as previously described. The exposure function may operate on the quantum of data outputted from a model when run. In this context, the model may be run, the quantum of data determined and then access granted to view the results based on the determined exposure.

At the same time, the exposure function may include an analysis of the history in making such a determination. As an example, if a maximum function is applied to a column of data, a single data value is revealed, i.e. that of the maximum value. If the function is repeated a 1000 time with unchanged parameters, the exposure that has occurred is still that of the maximum value. Accordingly, the exposure function may ignore calculating an exposure value where there is a record in the history of the function having previously been performed with the same parameters.

A billing function may be provided to allow an owner of a dataset to charge others for access to the contents of the dataset.

In one arrangement, a user may be permitted to operate in a "free" mode where they can run their models on an apparent dataset and then once they are satisfied with its performance can switch to a "billed" mode where they are charged and the model is run on a real dataset. In such an arrangement, the quantum of data output from the model running on the apparent data set may be used to determine the price charged on the real dataset.

Figure 13:
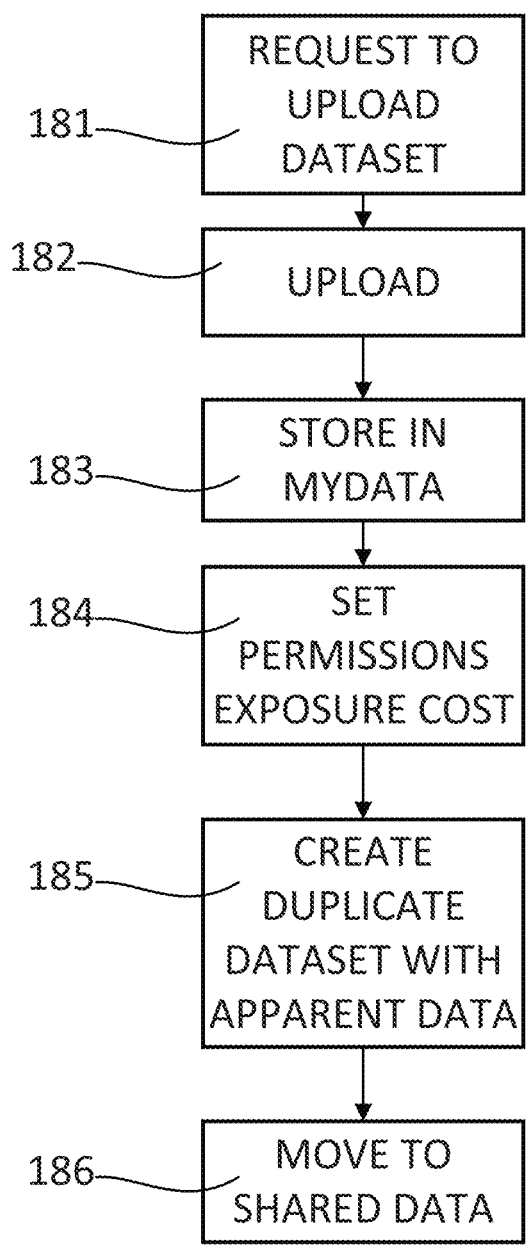
FIG. 13 is a method according to an aspect of the application.

FIG. 13 shows a simplified flow diagram of an example method 180 for a user to publish their dataset. The method commences with a user requesting 181 to upload a dataset to the system. Suitably, this would comprise a user logging in to the system, clicking an appropriate button on an interface and then identifying the location of their dataset. The system may be configured to accept a plurality of different dataset formats, e.g. Microsoft Excel, CSV files etc. The system then receives the file uploaded 182 and stores it. At this juncture, the file may be converted to a standard format from the format in which the dataset was created. The dataset is then stored 183 and becomes visible in the MYDATA section for the user. Once a dataset is stored on the system, the user may choose to share it, whereupon, they would be presented with a menu allowing them to indicate 184 with whom it should be shared, the associated permissions and provide a level of exposure that they are comfortable with.

At this juncture, the system may create 185 a corresponding apparent data set and the corresponding apparent and real data sets may be moved 186 to the Shared Data section and become visible here to any user with whom it has been shared. For example, if the dataset was shared globally then all users of the system would see the dataset in their shared data folder.

Figure 14:
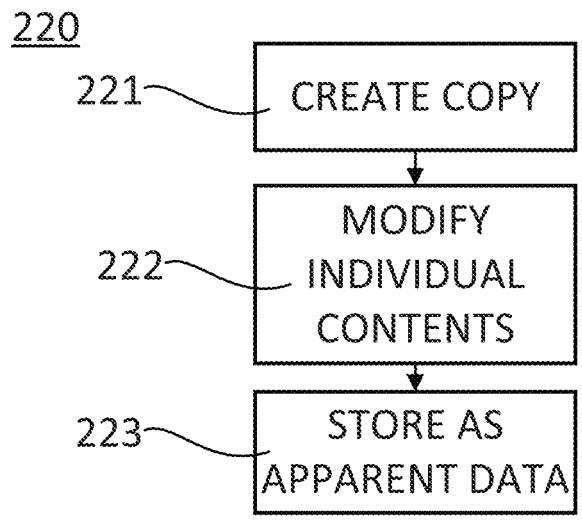
FIG. 14 is a first method for use as a step in the method of FIG. 13.

A process 220 for creating an apparent data set from a real data set is shown in FIG. 14. The process begins by taking a copy 221 of the real data set. The individual data values within the data set are then modified 222 so that the data set no longer corresponds to the original.

Once this has been completed for all values within the dataset, the modified data set is stored 223 as an apparent data set for the real one. It will be appreciated that apparent data sets need not be pre-calculated and stored but may instead be calculated on the fly. However, it will be appreciated that where there is multiple users, it is more efficient to create the apparent data set once and store it for subsequent user.

Figure 15:
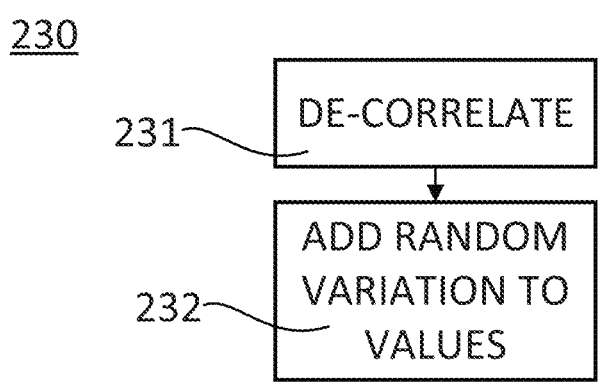
FIG. 15 is a first method for use as a step in the method of FIG. 13.

An exemplary method 230 for creating an apparent dataset is shown in FIG. 15 as comprising two steps. A first step 231 de-correlates the data between the two columns. Such a de-correlation process may comprise randomly re-ordering 231 the data values in one column with respect to the data values in another column. In such an arrangement, the mapping of the ordered data to the re-ordered data may be stored to recreate the data if required. Alternatively, the data values in one column may be cyclically shifted by a random number with respect to a first column. Knowledge of what random number was used allows the system to implement a function on the original correlated data. It will be appreciated that this random number may also be associated with an individual user of the dataset and act as a watermark.

A disadvantage of de-correlation is that a person developing a model using the apparent dataset may lose some perspective on the nature of the data. Accordingly, de-correlation may not always be used. In this context, a user when sharing their dataset may be provided with an option as to how the apparent dataset is to be created and as an example whether de-correlation is to be used.

Another step 232, which may be used in conjunction with or in place of the de-correlation, in the process is to introduce a random variation to the individual data values. In one possible approach, the actual value is modified by adding a random variation. The random variation may be within bounds set by a user. Thus for example, a user as part of the sharing process might indicate that they would allow 30% variation in which case the random variation would be within bounds of ±15%. Alternatively, the variation may be determined from the exposure level set by a user. As before, the random variation introduced may be stored so that it may be employed at a later time.

Equally, the process may involve the replacement of the values with randomly created values or as explained previously with an encrypted form of the values.

Figure 16:
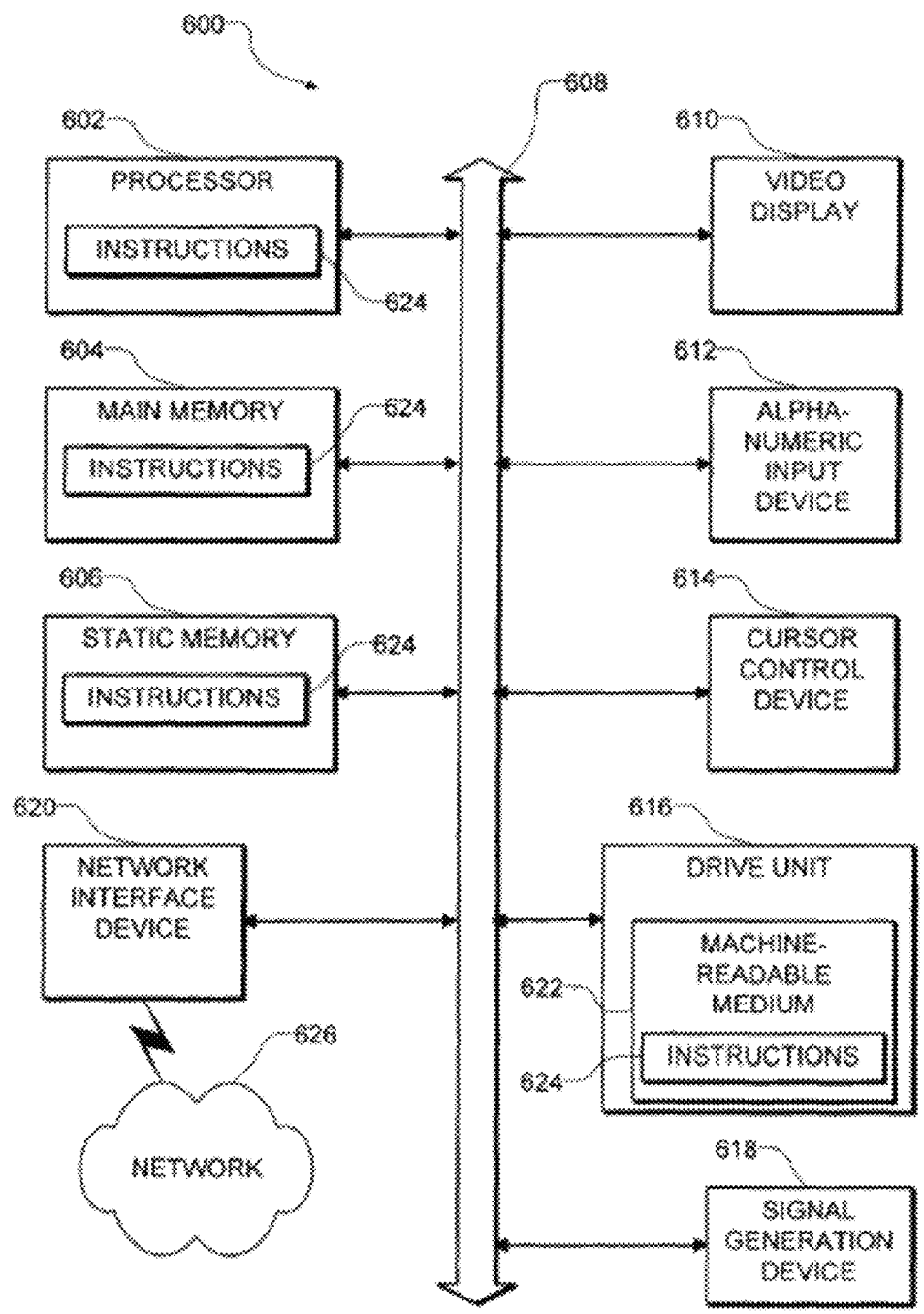
FIG. 16 is an exemplary computing device suitable for implementing the application server and other computing devices.

FIG. 16 shows a diagrammatic representation of machine in the example
form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608.

The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620. While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium"
shall accordingly be taken to include, but not be limited to, solid-state memories, optical and magnetic media, and carrier wave signals.

Thus, a method and system to publish contextual content have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1. 72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim.

Rather, as the following claims reflect, inventive subject matter lies in less than all features of a single disclosed embodiment. Thus the following claims are hereby incorporated into the Detailed Description, with each claim standing on its own as a separate embodiment.

We claim:
1. A computer system comprising:
   a data set storage area for storing a plurality of datasets, each dataset having at least one table, the table having a storage structure which may be represented in tabular form with columns and rows with each column having an associated field label and each row containing a datapoint having a plurality of elements, each element corresponding to a field label;
   a function library storing mathematical or statistical functions which may be selected to be performed upon a stored dataset, each of the mathematical or statistical functions having an associated exposure level;

a client interface allowing a user to select a first function to be performed upon a selected dataset;

wherein each dataset has a predetermined maximum exposure level associated with how much data in the dataset is permitted to be revealed;

wherein the system is configured to develop an aggregate exposure level from a first exposure level associated with the first function and a second exposure level associated with a second function previously performed upon the selected dataset and to determine whether the aggregate exposure level exceeds a predetermined maximum exposure level for the selected dataset and, if so, to limit a manner in which a result of performing the first function on the selected dataset is presented to the user.

2. The computer system according to claim 1, wherein the client interface is configured to allow a user an apparent view of a dataset, the apparent view of the dataset having the same associated field labels as the dataset and the same number of datapoints but where the elements are represented in a way from which the dataset cannot be reconstructed.

3. The computer system according to claim 2, wherein the apparent view of the dataset is provided by de-correlating the datapoints so that the row data presented to a user is a jumbled form of the dataset.

4. The computer system according to claim 3, wherein the system is configured to store correlation information allowing the reconstruction of the dataset from the apparent view.

5. The computer system according to claim 4, wherein the correlation information is employed by at least one function from the function library.

6. The computer system according to claim 2, wherein the elements corresponding to at least one of the associated labels within the dataset are encrypted for the apparent view.

7. The computer system according to claim 1, wherein the library of functions include at least one function which may be used to obtain a child dataset from one of the stored datasets which may be considered the parent dataset.

8. The computer system according to claim 7, wherein the system allows a user to store the child dataset for the performance of a subsequent function.

9. The computer system according to claim 7, wherein the exposure level of the child dataset is inherited from the parent dataset.

10. The computer system according to claim 1, wherein a user uploading a dataset provides an exposure level for the dataset.

11. The computer system according to claim 1, wherein the system is configured to track the functions called upon a dataset.

12. The computer system according to claim 11, wherein the exposure level attained is determined with respect to the aggregate of functions tracked.

13. The computer system according to claim 12, wherein each function has an associated weighting value and these are employed when calculating the aggregate of functions tracked.

14. A computer system comprising:

a data set storage area for storing a plurality of datasets, each dataset having a storage structure which may be represented in tabular form with rows and columns, with each column having an associated field label and each row containing a datapoint having a plurality of elements, each element corresponding to a field label;

a function library storing mathematical or statistical functions which may be selected to be performed upon a stored dataset, each of the mathematical or statistical functions having an associated exposure level;

a client interface allowing a user to select a first function from the function library to be performed upon a selected dataset to provide a transformed dataset, wherein a maximum exposure level is associated with the selected dataset;

wherein the computer system is configured to calculate an aggregate exposure level from a first exposure level associated with the first function and a second exposure level associated with a second function previously performed on the selected dataset and wherein the client interface is configured to allow a user to view the dataset in an obscured tabular form if the aggregate exposure level exceeds the maximum exposure level, wherein the obscured tabular form corresponds to the tabular structure having the same field labels but where at least some of the elements show false values rather than the true contents, wherein the false values result from decorrelation of elements between fields of the dataset.

15. The computer system according to claim 14, wherein the false values are encrypted values.

16. The computer system according to claim 14, wherein the library of functions include at least one function which may be used to obtain a child dataset from one of the stored datasets which may be considered the parent dataset and where the obscured tabular form of the child is inherited from the parent.

17. The computer system according to claim 14, wherein the system is configured to embed a watermark into a dataset prior to use by a user of the dataset.

18. The computer system according to claim 17, wherein the embedded watermark is uniquely associated with the user.

19. The computer system according to claim 17, wherein the library of functions include at least one function which may be used to obtain a child dataset from the watermarked dataset which may be considered the parent dataset and where the system is configured to ensure the watermark is inherited within the child dataset so that the user is associated with the child dataset.

20. A computer system comprising:

a data set storage area for storing at least one dataset, the dataset having a storage structure which may be represented in tabular form with columns and rows with each column having an associated field label and each row containing a datapoint having a plurality of elements, each element corresponding to a field label;

a function library storing mathematical or statistical functions which may be selected to operate upon a stored dataset, each of mathematical or statistical functions having an associated exposure level;

a client interface allowing a user to select at least one function to be performed upon a selected dataset;

wherein the at least one dataset has a maximum exposure level associated with how much data in the dataset is permitted to be revealed; wherein the system is configured to determine an aggregate exposure level from a first exposure level associated with the selected at least one function and a second exposure level associated from a previously selected function performed upon the dataset and to determine whether the aggregate exposure level would exceed the maximum exposure when performing the selected at least one function upon the selected dataset and, if so, to limit a manner in which a result of performing the at least one function is presented to the user, wherein one of the functions of the client interface is to allow a user a view of the dataset and where the user is presented with an apparent view of a dataset, the apparent view of the dataset having the same associated field labels as the dataset and the same number of datapoints but where the elements are represented in a way from which the dataset cannot immediately be reconstructed.

21. The computer system according to claim 20, wherein the apparent view of the dataset is created from the real dataset by the introduction of a random variation to elements within the individual datapoints.

22. The computer system according to claim 20, wherein the random error is bounded within a range of the original values of the elements.

23. The computer system according to claim 20, wherein the apparent view of the dataset is provided by de-correlating the datapoints so that the row data presented to a user is a jumbled form of the dataset.

24. The computer system according to 20, wherein the function is one which may be used to obtain a child dataset from the at least one dataset which may be considered the parent dataset.

* * * * *